(12) United States Patent
Tsai

(10) Patent No.: US 9,878,774 B2
(45) Date of Patent: Jan. 30, 2018

(54) SYSTEM AND METHOD FOR OPERATING A DROOP PANEL USING A PIN JOINT LINKAGE ASSEMBLY

(71) Applicant: The Boeing Company, Chicago, IL (US)

(72) Inventor: Kevin R. Tsai, Seattle, WA (US)

(73) Assignee: The Boeing Company, Chicago, IL (US)

( * ) Notice: Subject to any disclaimer, the term of this patent is extended or adjusted under 35 U.S.C. 154(b) by 689 days.

(21) Appl. No.: 14/491,976

(22) Filed: Sep. 19, 2014

(65) Prior Publication Data

US 2016/0251074 A1 Sep. 1, 2016

(51) Int. Cl.
*B64C 3/50* (2006.01)
*B64C 9/16* (2006.01)

(52) U.S. Cl.
CPC ...................... *B64C 9/16* (2013.01)

(58) Field of Classification Search
CPC .... B64C 9/10; B64C 3/50; B64C 9/12; B64C 9/16; B64C 13/28; B64C 9/18; B64C 9/20
See application file for complete search history.

(56) References Cited

U.S. PATENT DOCUMENTS

| 3,853,289 | A | | 12/1974 | Nevermann et al. | |
|---|---|---|---|---|---|
| 4,043,523 | A | * | 8/1977 | Bartoe, Jr. | B64C 5/16 244/221 |
| 4,448,375 | A | * | 5/1984 | Herndon | B64C 9/16 244/215 |
| 4,702,442 | A | * | 10/1987 | Weiland | B64C 9/16 244/216 |
| 7,954,769 | B2 | | 6/2011 | Bushnell | |
| 2013/0320151 | A1 | * | 12/2013 | Kordel | B64C 9/16 244/215 |
| 2014/0145039 | A1 | * | 5/2014 | Beyer | B64C 9/10 244/215 |

* cited by examiner

*Primary Examiner* — Philip J Bonzell

(57) ABSTRACT

A system for operating a droop panel on an air vehicle, the droop panel positioned between a fixed structure and a trailing edge flap on the wing. The system includes a pin joint linkage assembly coupled between and to the fixed structure, the droop panel, and the trailing edge flap. The assembly has a first link attached to the fixed structure; and a second link coupled to the first link, and pivotably connected to a third pin joint, connected to a fourth pin joint, and an angled portion pivotably connected to a second pin joint. The assembly has a third link coupled to the second link, and coupled to the fourth pin joint and to a fifth pin joint attached to the trailing edge flap. The assembly is configured to operate the droop panel by concurrently moving the droop panel and the trailing edge flap in a single coordinated motion.

20 Claims, 12 Drawing Sheets

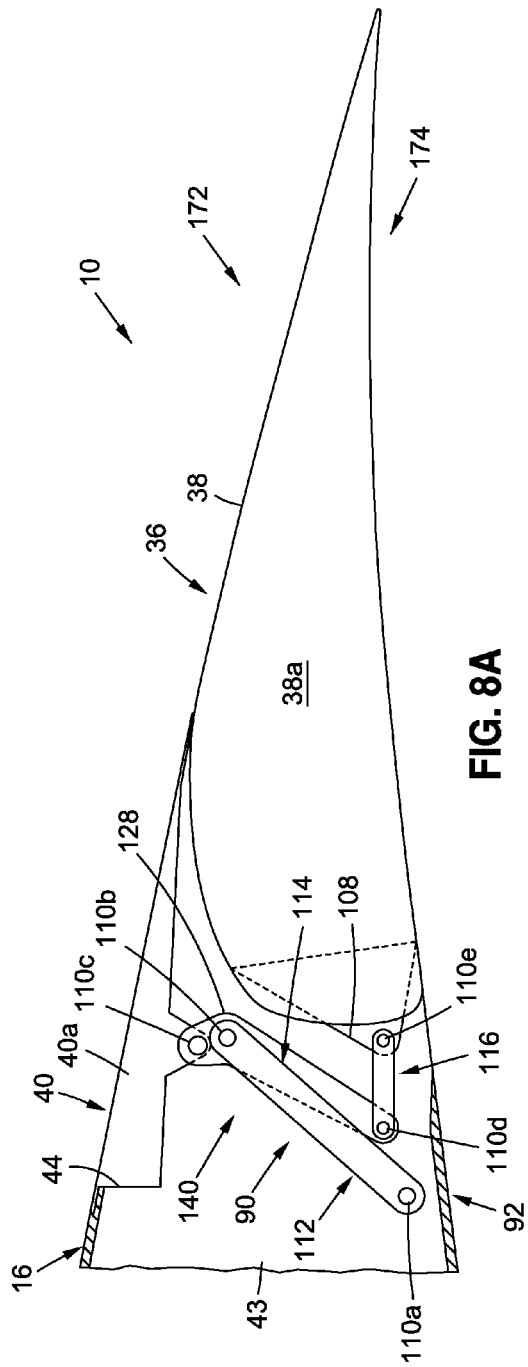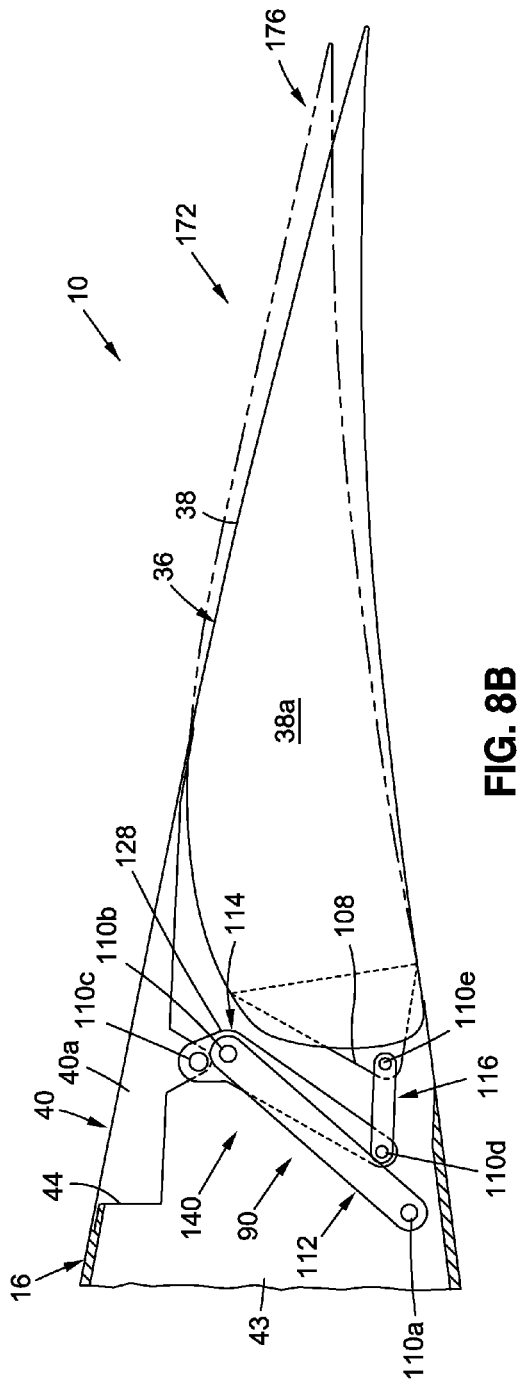

SYSTEM AND METHOD FOR OPERATING A DROOP PANEL USING A PIN JOINT LINKAGE ASSEMBLY

BACKGROUND

1) Field of the Disclosure

The disclosure relates generally to systems and methods for operating droop panels and flaps, and more specifically, to systems and methods for concurrently moving droop panels and trailing edge flaps of air vehicles using a pin joint linkage system.

2) Description of Related Art

The wings of high-speed transport air vehicles, such as aircraft, typically include various movable surfaces or devices to provide aircraft control and/or to configure the aircraft for low speed operations, such as aircraft takeoff and landing. Such movable surfaces or devices may include, for example, leading edge devices, such as flaps and slats, and trailing edge devices, such as droop panels or spoilers, trailing edge flaps, and ailerons. These movable surfaces or devices are typically movable between a stowed position and a variety of deployed or extended positions, depending upon the particular flight condition of the aircraft. For example, during the cruise mode of the aircraft, these movable surfaces and devices may be stowed or retracted to reduce aircraft drag, and during the takeoff or landing modes of the aircraft, these movable surfaces and devices may be deployed or extended to increase aircraft lift.

In the design and manufacture of high-speed transport air vehicles, such as aircraft, it is desirable to improve low speed performance of the aircraft by decreasing the minimum takeoff and landing distances of the aircraft. Improved efficiency and performance of aircraft takeoff and landing may result in reduced aircraft fuel consumption, and in turn, may result in reduced aircraft fuel costs. It has been found that drooping or downwardly lowering the droop panels or spoilers of the aircraft wing during takeoff and landing may improve airflow proximate to the wing and to a deployed trailing edge flap, as compared to when the droop panels or spoilers are not drooped. Such improved airflow may improve the overall performance of the wing by increasing lift and/or decreasing drag.

Known systems and methods exist for operating droop panels or spoilers. One such known system and method uses an eccentric linkage mechanism, typically a circular disk fixed to a rotating axle, which is offset from the center of the circle. Such known eccentric linkage mechanism uses a hydraulic actuator to operate the droop panel or spoiler separately from trailing edge flap.

However, such eccentric linkage mechanisms may be structurally heavy in weight, which in turn, may result in increased structural weight to the aircraft wing and aircraft. Moreover, such eccentric linkage mechanisms may have complex joints with numerous parts, which may result in increased complexity with assembly, and in turn, may result in increased labor and assembly costs. Further, such eccentric linkage mechanisms may expand the connection area between links, which in turn, may result in decreased integration space in the aircraft wing for integration of one or more other aircraft systems, such as an electrical system, a mechanical system, a hydraulic system, or another aircraft system.

Another known system and method for operating droop panels or spoilers exists that uses a hydraulic actuator system to drive a droop panel or spoiler in both an upward direction and in a downward direction. However, on aircraft where aircraft evacuation slides may be required at the most inboard sides of the aircraft wings on overwing exits, evacuation slide requirements may affect or limit certain operational parameters of spoilers and flight control panels.

In addition, known droop panels or spoilers driven by hydraulic actuator systems may require the use of additional electro-mechanical actuators in order to meet aircraft roll capability requirements. However, such additional electro-mechanical actuators may increase system complexity and weight, and may result in increased installation and maintenance costs.

In addition, another known system and method for operating droop panels or spoilers exists that includes a deep (long) hinge flap system and that uses a mechanical straight linkage system to drive the droop panel or spoiler to a drooped position. However, such mechanical straight linkage system of the deep hinge flap system may span a significant distance, e.g., six feet below the wing surface, and may thus add weight and complexity to the system, which in turn, may result in increased manufacturing and operation costs.

Accordingly, there is a need in the art for an improved system and method for operating a droop panel or spoiler of an air vehicle that provide advantages over known systems and methods.

SUMMARY

This need for an improved system and method for operation of droop panels or spoilers that provide advantages over known systems and methods is satisfied. As discussed in the below detailed description, embodiments of the improved system and method for operating a droop panel using a pin joint linkage assembly may provide significant advantages over known systems and methods.

In one embodiment of the disclosure, there is provided a system for operating a droop panel on an air vehicle. The system comprises a droop panel on a wing of the air vehicle. The droop panel is positioned between a fixed structure on the wing and a trailing edge flap on the wing.

The system further comprises a pin joint linkage assembly operatively coupled between and to the fixed structure, the droop panel, and the trailing edge flap. The pin joint linkage assembly comprises a first link having a first end coupled to a first pin joint fixedly attached to the fixed structure, and having a second end coupled to a second pin joint.

The pin joint linkage assembly further comprises a second link coupled to the first link. The second link has a first end pivotably connected to a third pin joint, a second end connected to a fourth pin joint, and an angled portion pivotably connected to the second pin joint and positioned between the first and second ends of the second link, wherein the second pin joint and the third pin joint are separate.

The pin joint linkage assembly further comprises a third link coupled to the second link. The third link has a first end coupled to the fourth pin joint, and has a second end coupled to a fifth pin joint fixedly attached to the trailing edge flap. The pin joint linkage assembly is configured to operate the droop panel by concurrently moving both the droop panel and the trailing edge flap from a stowed position to a deployed position in a single coordinated motion, thus allowing the droop panel to be driven off the trailing edge flap without use of a motor.

In another embodiment of the disclosure, there is provided an aircraft. The aircraft comprises a fuselage and at least one wing coupled to the fuselage. The at least one wing has a leading edge, a trailing edge, and a fixed structure therebetween. The aircraft further comprises a trailing edge flap coupled to the trailing edge and being movable relative to the at least one wing between a stowed position and a deployed position.

The aircraft further comprises a droop panel operation system coupled between the fixed structure and the trailing edge flap. The droop panel operation system comprises a droop panel positioned on a wing upper surface and forward of the trailing edge flap. The droop panel operation system further comprises a pin joint linkage assembly operatively coupled between and to the fixed structure, the droop panel, and the trailing edge flap.

The pin joint linkage assembly comprises a first link having a first end coupled to a first pin joint fixedly attached to the fixed structure, and having a second end coupled to a second pin joint. The pin joint linkage assembly further comprises a second link coupled to the first link. The second link has a first end pivotably connected to a third pin joint, a second end connected to a fourth pin joint, and an angled portion pivotably connected to the second pin joint and positioned between the first and second ends of the second link, wherein the second pin joint and the third pin joint are separate. The pin joint linkage assembly further comprises a third link coupled to the second link. The third link has a first end coupled to the fourth pin joint, and has a second end coupled to a fifth pin joint fixedly attached to the trailing edge flap.

The aircraft further comprises a control system operatively coupled to the pin joint linkage assembly. The control system is configured to control the pin joint linkage assembly to operate the droop panel by concurrently moving both the droop panel and the trailing edge flap from the stowed position to the deployed position in a single coordinated motion, thus allowing the droop panel to be driven off the trailing edge flap without use of a motor.

In another embodiment of the disclosure, there is provided a method for operating a droop panel on an air vehicle. The method comprises the step of operatively coupling a pin joint linkage assembly between and to a fixed structure on a wing of the air vehicle, to a droop panel positioned aft of the fixed structure, and to a trailing edge flap positioned aft of the droop panel.

The pin joint linkage assembly comprises a first link having a first end coupled to a first pin joint fixedly attached to the fixed structure, and having a second end coupled to a second pin joint. The pin joint linkage assembly further comprises a second link coupled to the first link. The second link has a first end pivotably connected to a third pin joint, a second end connected to a fourth pin joint, and an angled portion pivotably connected to the second pin joint and positioned between the first and second ends of the second link, wherein the second pin joint and the third pin joint are separate. The pin joint linkage assembly further comprises a third link coupled to the second link. The third link has a first end coupled to the fourth pin joint, and has a second end coupled to a fifth pin joint fixedly attached to the trailing edge flap.

The method further comprises the step of using the pin joint linkage assembly to operate the droop panel by concurrently moving both the droop panel and the trailing edge flap from a stowed position to a deployed position in a single coordinated motion, thus allowing the droop panel to be driven off the trailing edge flap without use of a motor.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 8A is an illustrations of a partial cross-sectional side view of an embodiment of a system of the disclosure having a trailing edge variable camber (TEVC) system in a stowed position;

FIG. 8B is an illustration of a partial cross-sectional side view of the system of FIG. 8A with the trailing edge variable camber (TEVC) system in an up position; and, FIG. 9 is an illustration of a flow diagram of an exemplary embodiment of a method of the disclosure.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and will fully convey the scope of the disclosure to those skilled in the art.

Figure 1:
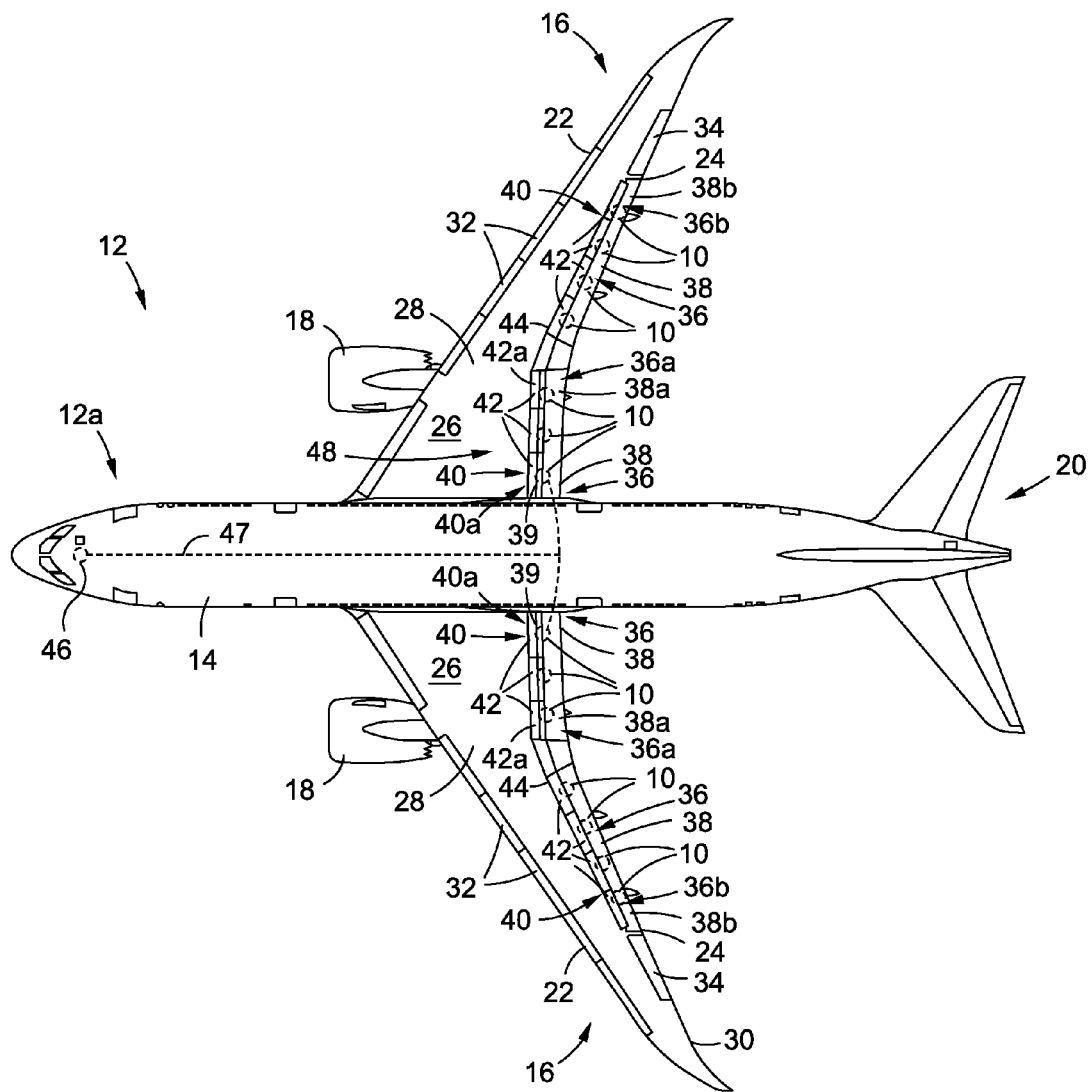
FIG. 1 is an illustration of a top view of an aircraft that may incorporate one or more embodiments of a system of the disclosure.

Now referring to the Figures, FIG. 1 is an illustration of a perspective view of an air vehicle 12, such as in the form of an aircraft 12a that may incorporate one or more embodiments of a system 10 for operating a droop panel 40 of the disclosure. As shown in FIG. 1, the air vehicle 12, such as in the form of an aircraft 12a, comprises a fuselage 14, wings 16, one or more propulsion units 18, and an empennage 20. As further shown in FIG. 1, each of the wings 16 comprises a leading edge 22, a trailing edge 24, a wing body 26, a wing upper surface 28, a wing lower surface 30, slats 32, and ailerons 34.

As further shown in FIG. 1, each of the wings 16 comprises trailing edge devices 36, such as inboard trailing edge devices 36a and outboard trailing edge devices 36b. Preferably, the trailing edge devices 36 (see FIG. 1) are in the form of trailing edge flaps 38, such as inboard trailing edge flaps 38a and outboard trailing edge flaps 38b. As further shown in FIG. 1, each of the wings 16 comprises droop panels 40, such as inboard droop panels 40a. The droop panels 40 may be in the form of spoilers 42, such a inboard spoilers 42a. As shown in FIG. 1, the trailing edge flaps 38 are positioned aft of the droop panels 40, and the droop panels 40 are positioned forward of the trailing edge flaps 38.

The droop panel 40 (see FIG. 1), such as in the form of spoiler 42 (see FIG. 1), comprises a supporting wing beam 43 (see FIGS. 4A-4D). The supporting wing beam 43 (see FIGS. 4A-4D) is a fixed structure 96 (see FIGS. 4A-4C) that the droop panel 40 (see FIGS. 4A-4C) is fixed to. The droop panels 40 (see FIG. 1) are attached to the wing upper surface 28 (see FIG. 1) at a hinge line 44 (see FIG. 1).

As further shown in FIG. 1, the air vehicle 12, such as in the form of an aircraft 12a, comprises a control system 46 having a control system connection 47 to an air vehicle system 48. The air vehicle system 48 may comprise one or more of an electrical system, a mechanical system, a hydraulic system, or another suitable air vehicle system.

Although the air vehicle 12, such as in the form of an aircraft 12a, shown in FIG. 1 is generally representative of a commercial passenger aircraft having one or more embodiments of the system 10, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles, as well as automobiles, trucks, or other structures suitable for incorporating one or more embodiments of the system 10 of the disclosure.

Figure 2:
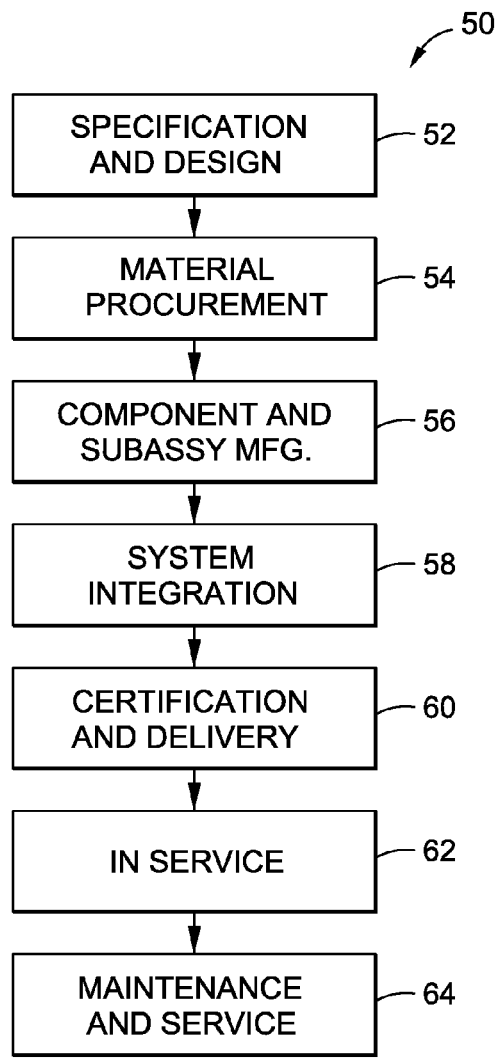
FIG. 2 is an illustration of a flow diagram of an aircraft manufacturing and service method.
Figure 3:
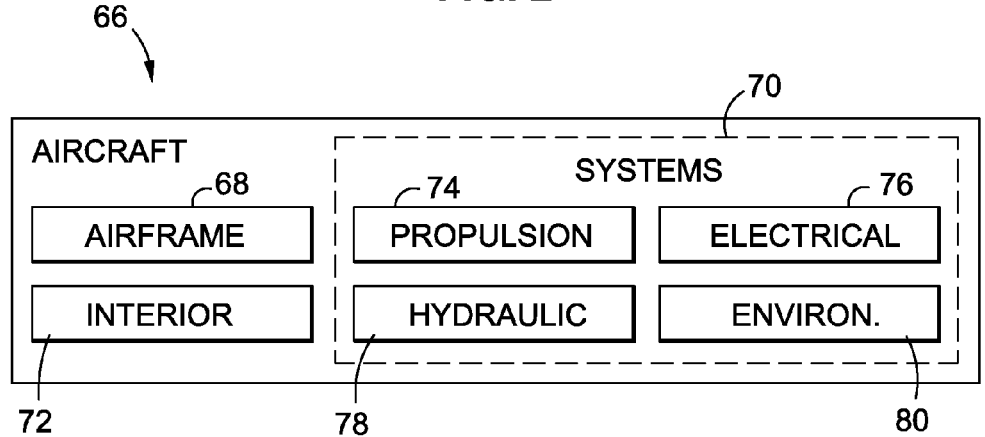
FIG. 3 is an illustration of a block diagram of an aircraft.

FIG. 2 is an illustration of a flow diagram of an aircraft manufacturing and service method 50. FIG. 3 is an illustration of a block diagram of an aircraft 66. Referring to FIGS. 2-3, embodiments of the disclosure may be described in the context of the aircraft manufacturing and service method 50 as shown in FIG. 2 and the aircraft 66 as shown in FIG. 3.

During pre-production, exemplary aircraft manufacturing and service method 50 may include specification and design 52 of the aircraft 66 and material procurement 54. During manufacturing, component and subassembly manufacturing 56 and system integration 58 of the aircraft 66 takes place. Thereafter, the aircraft 66 may go through certification and delivery 60 in order to be placed in service 62. While in service 62 by a customer, the aircraft 66 may be scheduled for routine maintenance and service 64 (which may also include modification, reconfiguration, refurbishment, and other suitable services).

Each of the processes of exemplary aircraft manufacturing and service method 50 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and supplier. An operator may include, without limitation, an airline, leasing company, military entity, service organization, and other suitable operators.

As shown in FIG. 3, the aircraft 66 produced by exemplary aircraft manufacturing and service exemplary method 50 may include an airframe 68 with a plurality of systems 70 and an interior 72. Examples of the plurality of systems 70 may include one or more of a propulsion system 74, an electrical system 76, a hydraulic system 78, and an environmental system 80. Any number of other systems may be included. Although an aerospace example is shown, the principles of the disclosure may be applied to other industries, such as the automotive industry.

Methods and systems embodied herein may be employed during any one or more of the stages of the exemplary aircraft manufacturing and service method 50. For example, components or subassemblies corresponding to component and subassembly manufacturing 56 may be fabricated or manufactured in a manner similar to components or subassemblies produced while the aircraft 66 is in service 62. Also, one or more apparatus embodiments, method embodiments, or a combination thereof, may be utilized during component and subassembly manufacturing 56 and system integration 58, for example, by substantially expediting assembly of or reducing the cost of the aircraft 66. Similarly, one or more of apparatus embodiments, method embodiments, or a combination thereof, may be utilized while the aircraft 66 is in service 62, for example and without limitation, to maintenance and service 64.

Figure 4A:
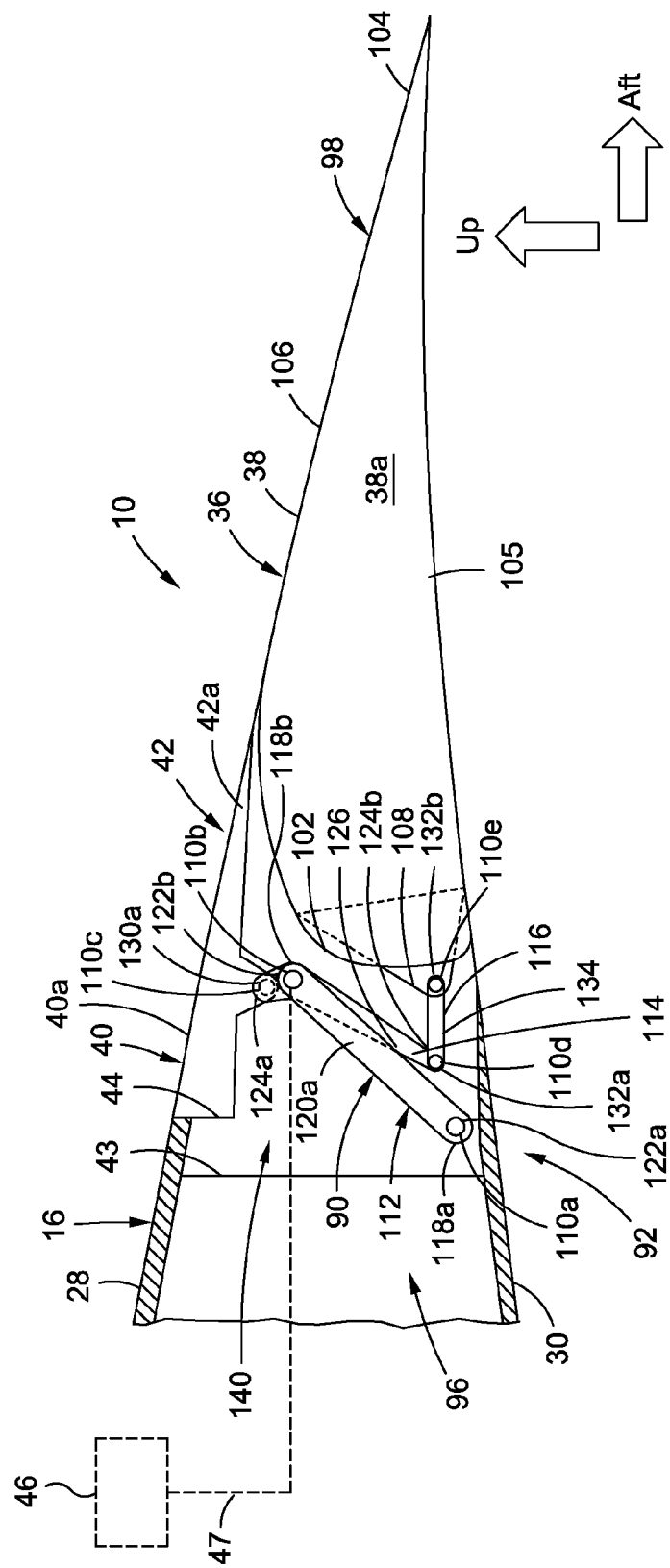
FIG. 4A is an illustration of a partial cross-sectional side view of an embodiment of a system of the disclosure in a stowed position.
Figure 4B:
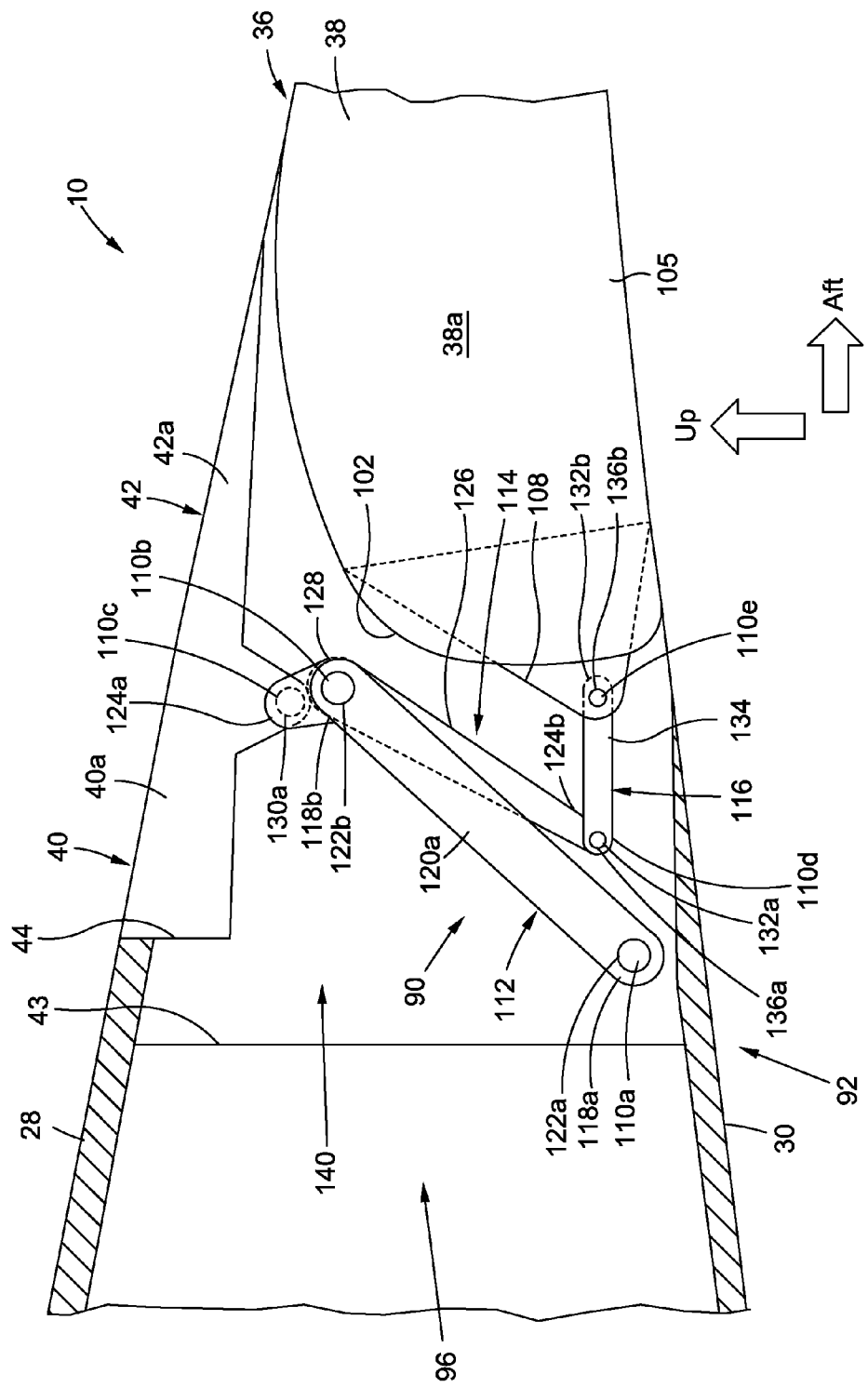
FIG. 4B is an illustration of a close-up view of the system of FIG. 4A in the stowed position.
Figure 4C:
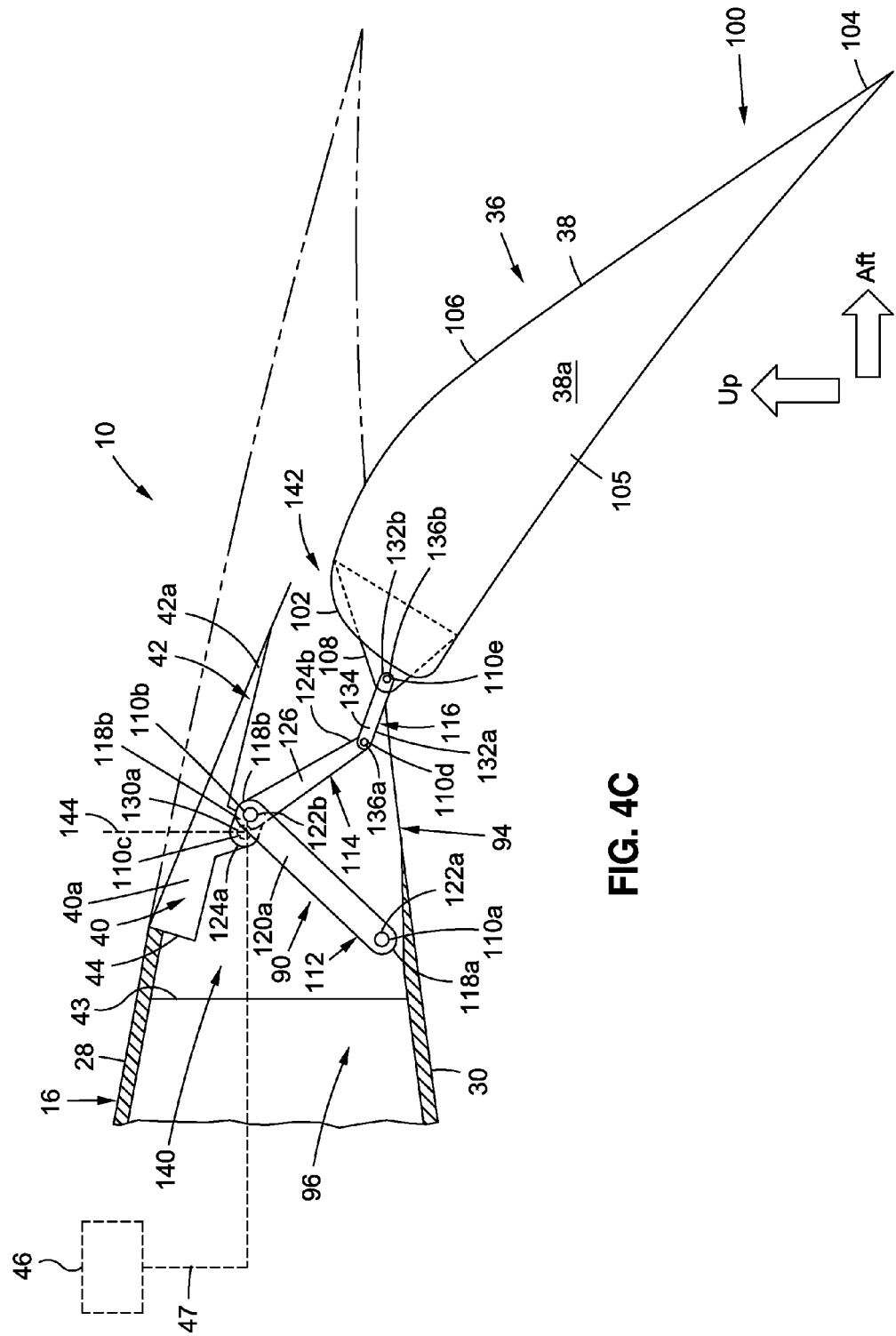
FIG. 4C is an illustration of a partial cross-sectional side view of the embodiment of the system of FIG. 4A in a deployed position.
Figure 4D:
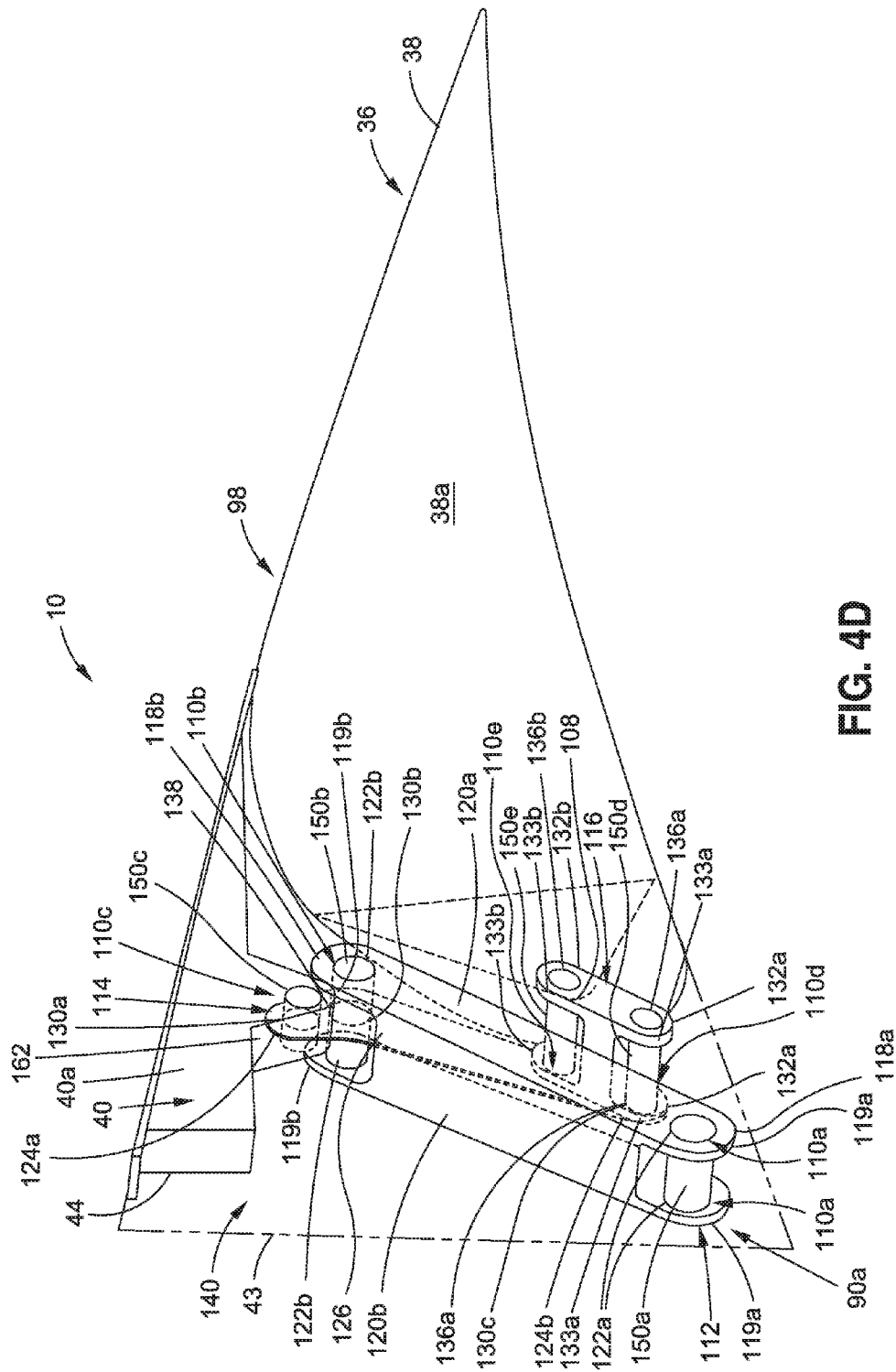
FIG. 4D is an illustration of a perspective side view of the embodiment of the system of FIG. 4A in a stowed position and shows an embodiment of a pin joint linkage assembly of the system.
Figure 4E:
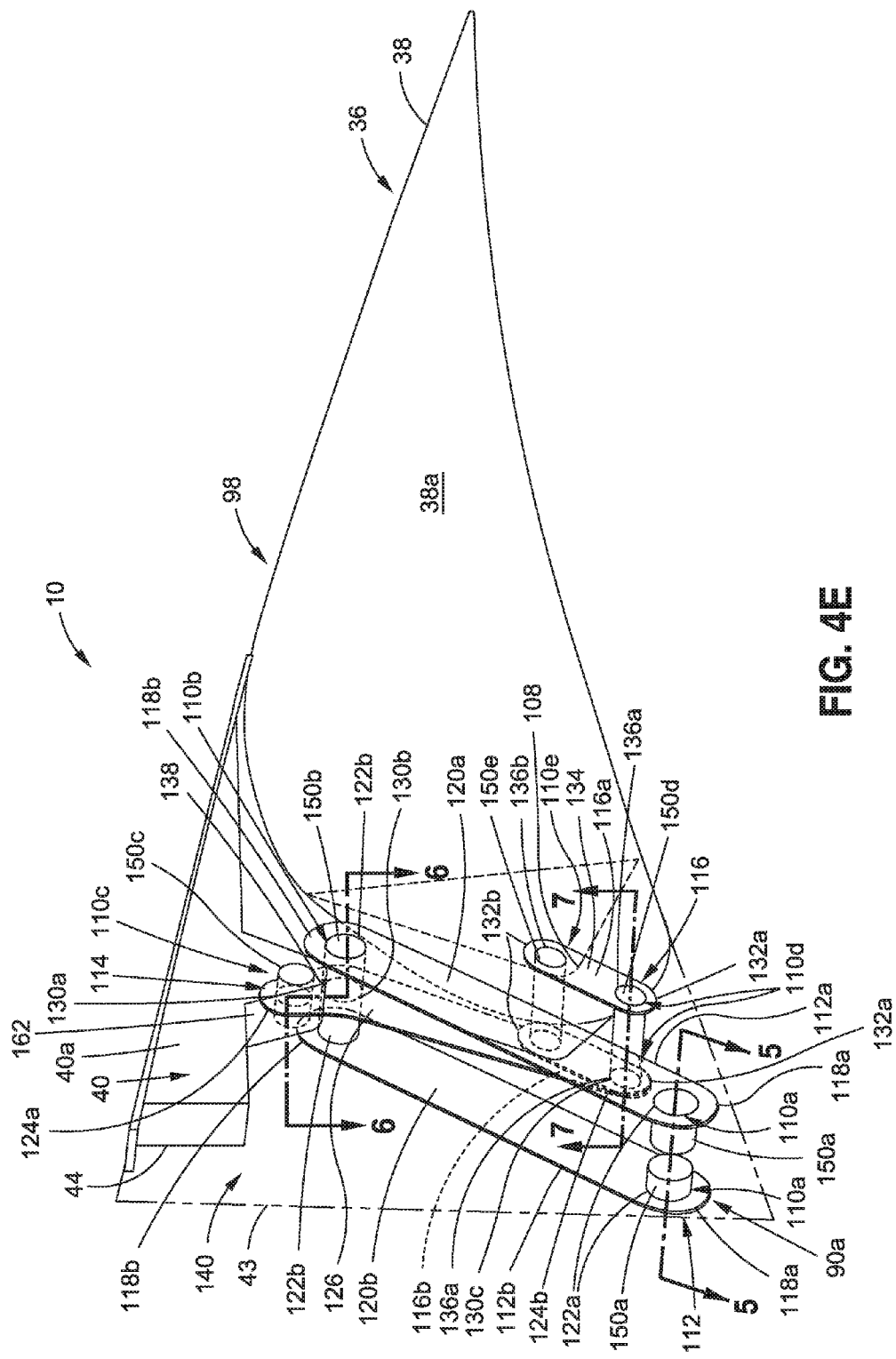
FIG. 4E is an illustration of a perspective side view of another embodiment of a pin joint linkage assembly of the system of the disclosure.

In one embodiment of the disclosure, as shown in FIG. 4A, there is provided the system 10 for operating the droop panel 40 on an air vehicle 12 (see FIG. 1). FIG. 4A is an illustration of a partial cross-sectional side view of an embodiment of the system 10 of the disclosure, where the system 10 is in a stowed position 98. FIG. 4B is an illustration of a close-up view of the system 10 of FIG. 4A, where the system 10 is in the stowed position 98. FIG. 4C is an illustration of a partial cross-sectional side view of the embodiment of the system 10 of FIG. 4A, where the system 10 is in a deployed position 100. FIG. 4D is an illustration of a perspective side view of the embodiment of the system 10 of FIG. 4A, where the system is in the stowed position 98. FIG. 4A further shows an embodiment of a pin joint linkage assembly 90 of the system 10. FIG. 4E is an illustration of a perspective side view of another embodiment of a pin joint linkage assembly 90a of the system 10 of the disclosure. FIGS. 4A-4C show an up direction arrow and an aft direction arrow for reference.

As shown in FIGS. 4A-4E, the system 10 comprises the droop panel 40 on the wing 16 of the air vehicle 12 (see FIG. 1). Preferably, the droop panel 40 (see FIGS. 4A-4E) comprises an inboard droop panel 40a (see FIGS. 4A-4E). The droop panel 40 (see FIGS. 4A-4C) may be in the form of spoiler 42 (see FIGS. 4A-4C), such as inboard spoiler 42a (see FIGS. 4A-4C).

As shown in FIGS. 4A-4C, the droop panel 40, such as in the form of the inboard droop panel 40a, is positioned between a fixed structure 96 on the wing 16 and a trailing edge device 36, such as a trailing edge flap 38, on the wing 16. Preferably, the fixed structure 96 (see FIGS. 4A-4C) comprises a supporting wing beam 43 attached to the wing 16 of the air vehicle 12, such as an aircraft 12a (see FIG. 1). Preferably, the trailing edge flap 38 comprises an inboard trailing edge flap 38a.

The system 10 (see FIGS. 4A-4D) further comprises in one embodiment a pin joint linkage assembly 90 (see FIGS. 4A-4D) operatively coupled between and to the fixed structure 96 (see FIGS. 4A-4C), the droop panel 40 (see FIGS. 4A-4D), and the trailing edge flap 38 (see FIGS. 4A-4D). FIGS. 4A-4B show the pin joint linkage assembly 90 in a stowed position 92. FIG. 4C shows the pin joint linkage assembly 90 in a deployed position 94. As shown in FIG. 4E, the system 10 may comprise, in another embodiment, a pin joint linkage assembly 90a operatively coupled between and to the fixed structure 96 (see FIG. 4A), the droop panel 40 (see FIG. 4E), and the trailing edge flap 38 (see FIG. 4E).

The pin joint linkage assembly 90 (see FIGS. 4A-4D) or the pin joint linkage assembly 90a (see FIG. 4E) are configured to operate the droop panel 40 (see FIGS. 4A-4E) by concurrently moving both the droop panel 40 (see FIGS. 4A-4E) and the trailing edge flap 38 (see FIGS. 4A-4E) from the stowed position 98 (see FIG. 4A) to the deployed position 100 (see FIG. 4C) in a single coordinated motion, thus allowing the droop panel 40 (see FIGS. 4A-4E) to be driven off the trailing edge flap 38 (see FIGS. 4A-4E) without use of a motor (not shown), where the motor may be, for example, hydraulic powered or electric powered.

Preferably, the droop panel 40 (see FIGS. 4A-4E), such as in the form of the inboard droop panel 40a (see FIGS. 4A-4E), is movable by the pin joint linkage assembly 90 (see FIGS. 4A-4D) or the pin joint linkage assembly 90a (see FIG. 4E), between the stowed position 98 (see FIG. 4A) and the deployed position 100 (see FIG. 4C). Preferably, the trailing edge flap 38 (see FIGS. 4A-4E), such as in the form of the inboard trailing edge flap 38a (see FIGS. 4A-4E), is configured to be movable and is preferably moved by the pin joint linkage assembly 90 (see FIGS. 4A-4D), or the pin joint linkage assembly 90a (see FIG. 4E), between the stowed position 98 (see FIG. 4A) and the deployed position 100 (see FIG. 4C).

As shown in FIGS. 4A, 4C, the trailing edge device 36, such as in the form of trailing edge flap 38, preferably has a leading end 102, a trailing end 104, a body 105 therebetween, and an upper flow surface 106. The leading end 102 (see FIGS. 4A-4D) of the trailing edge flap 38 (see FIGS. 4A-4D) has a bullnose portion 108 (see FIGS. 4A-4D).

In one embodiment, the pin joint linkage assembly 90 (see FIGS. 4A-4D) comprises a first link 112 (see FIG. 4D) having a first pin joint 110a (see FIGS. 4A-4D) at a first end 118a fixedly attached to the fixed structure 96 (see FIGS. 4A-4C), and having a second pin joint 110b (see FIGS. 4A-4D) at a second end 118b (see FIGS. 4B, 4D). As shown in FIG. 4D, the first link 112 has an elongated body 120a. As further shown in FIG. 4D, the first pin joint 110a of the first link 112 has openings 122a through portions 119a of the first end 118a, through which a first pin joint pin 150a may be inserted. As further shown in FIG. 4D, the second pin joint 110b of the first link 112 has openings 122b through portions 119b of the second end 118b, through which a second pin joint pin 150b may be inserted.

The pin joint linkage assembly 90 (see FIGS. 4A-4D) further comprises a second link 114 (see FIGS. 4B-4D) coupled to the first link 112 (see FIG. 4D). The second link 114 (see FIGS. 4B-4D) has a first end 124a (see FIGS. 4A-4D) pivotably connected to a third pin joint 110c (see FIGS. 4B-4D). The second link 114 (see FIGS. 4B-4D) further has a second end 124b (see FIGS. 4A-4D) connected to a fourth pin joint 110d (see FIGS. 4A-4D). The second link 114 (see FIGS. 4B-4D) further has an angled portion 128 (see FIG. 4B) pivotably connected to the second pin joint 110b (see FIGS. 4B-4D) and positioned between the first and second ends 124a, 124b (see FIGS. 4A-4D), of the second link 114 (see FIGS. 4B-4D).

As shown in FIG. 4D, the second link 114 has an elongated body 126. As shown in FIGS. 4A-4D, the second pin joint 110b and the third pin joint 110c are separate. A distance 138 (see FIG. 4D) separates the second pin joint 110b from the third pin joint 110c. As further shown in FIG. 4D, the third pin joint 110c of the second link 114 has an opening 130b through which a third pin joint pin 150c may be inserted.

The pin joint linkage assembly 90 (see FIGS. 4A-4D) further comprises a third link 116 (see FIG. 4D) coupled to the second link 114 (see FIG. 4D). The third link 116 (see FIG. 4D) has a first end 132a (see FIGS. 4A-4C) coupled to the fourth pin joint 110d (see FIGS. 4A-4D), and has a second end 132b (see FIGS. 4A-4C) coupled to a fifth pin joint 110e (see FIGS. 4A-4D) fixedly attached to the trailing edge flap 38 (see FIGS. 4A-4D). Preferably, the fifth pin joint 110e (see FIGS. 4A-4D) is fixedly attached to the bullnose portion 108 (see FIGS. 4A-4D) of the trailing edge flap 38 (see FIGS. 4A-4D).

As shown in FIGS. 4A-4C, the third link 116 has an elongated body 134. As further shown in FIG. 4D, the fourth pin joint 110d of the third link 116 has openings through portions 133a of the first end 132a, through which a fourth pin joint pin 150d may be inserted. As further shown in FIG. 4D, the fifth pin joint 110e of the third link 116 has openings 136b through portions 133b of the second end 132b, through which a fifth pin joint pin 150e may be inserted. Thus, the pin joint linkage assembly 90 (see FIGS. 4A-4D) may comprise a three link system attached at five points.

As shown in FIG. 4C, the second pin joint 110b is positioned aft of the third pin joint 110c, and the second pin joint 110b is positioned at a distance to the trailing edge flap 38 that is less than a distance of the third pin joint 110c to the trailing edge flap 38. This allows for an increased moment arm 144 (see FIG. 4C) on the droop panel 40 (see FIG. 4C) and decreased loads on the first pin joint 110a (see FIGS. 4A-4E), the second pin joint 110b (see FIGS. 4A-4E), the third pin joint 110c (see FIGS. 4A-4E), the fourth pin joint 110d (see FIGS. 4A-4E), and the fifth pin joint 110e (see FIGS. 4A-4E). As used herein, "moment arm" means a length between a joint axis and a line of force or load acting on that joint. The force or load acting on the joint may be a reaction force or load on the pin joint, for example, on the third pin joint 110c (see FIG. 4C).

FIG. 4E shows another embodiment of a pin joint linkage assembly 90a. As shown in FIG. 4E, the pin joint linkage assembly 90a comprises a pair of first links 112a, 112b, each having a first pin joint 110a at a first end 118a fixedly attached to the fixed structure 96, and each having a second end 118b coupled to a second pin joint 110b positioned between the pair of first links 112a, 112b. As shown in FIG. 4E, the first link 112a has an elongated body 120a, and the first link 112b has an elongated body 120b.

As further shown in FIG. 4E, the first pin joint 110a of each of the first links 112a, 112b has an opening 122a through which first pin joint pins 150a may be inserted, respectively. As further shown in FIG. 4E, the second pin joint 110b of each of the first links 112a, 112b has an opening 122b through which second pin joint pin 150b may be inserted.

As further shown in FIG. 4E, the pin joint linkage assembly 90a further comprises the second link 114 (see also FIGS. 4B-4D) coupled to the pair of first links 112a, 112b and positioned substantially between the pair of first links 112a, 112b. The second link 114 (see FIG. 4E) has the first end 124a (see FIG. 4E) pivotably connected to the third pin joint 110c (see FIG. 4E). The second link 114 (see FIG.

4E) further has the second end 124*b* (see FIG. 4E) connected to the fourth pin joint 110*d* (see FIG. 4E). The second link 114 (see FIG. 4E) further has the angled portion 128 (see FIG. 4B) pivotably connected to the second pin joint 110*b* (see FIGS. 4B, 4E) and positioned between the first and second ends 124*a*, 124*b* (see FIG. 4E), of the second link 114 (see FIG. 4E).

As shown in FIG. 4E, the second link 114 has elongated body 126. As further shown in FIG. 4E, the second pin joint 110*b* and the third pin joint 110*c* are separate. A distance 138 (see FIG. 4E) separates the second pin joint 110*b* from the third pin joint 110*c*.

As further shown in FIG. 4E, the second link 114 has opening 130*a* through which the third pin joint 110*c* may be inserted, has opening 130*b* through which the second pin joint 110*b* may be inserted, and has opening 130*c* through which the fourth pin joint 110*d* may be inserted.

The pin joint linkage assembly 90 (see FIG. 4E) further comprises a pair of third links 116*a*, 116*b* (see FIG. 4E) coupled to the second link 114 (see FIG. 4E). The third links 116*a*, 116*b* (see FIG. 4E) each have the fourth pin joint 110*d* (see FIG. 4E) at the first end 132*a* (see FIG. 4E). The second end 124*b* (see FIG. 4E) of the second link 114 (see FIG. 4E) is positioned between the first ends 132*a* (see FIG. 4E) of the pair of third links 116*a*, 116*b* (see FIG. 4E). Each of the third links 116*a*, 116*b* (see FIG. 4E) further has a second end 132*b* (see FIG. 4E) coupled to a fifth pin joint 110*e* (see FIG. 4E) fixedly attached to the trailing edge flap 38 (see FIG. 4E). Preferably, the fifth pin joint 110*e* (see FIG. 4E) is fixedly attached to the bullnose portion 108 (see FIG. 4E) of the trailing edge flap 38 (see FIG. 4E).

As shown in FIG. 4E, each of the third links 116*a*, 116*b* has an elongated body 134. As further shown in FIG. 4E, the fourth pin joint 110*d* of each of the third links 116*a*, 116*b* has openings 136*a* at the first end 132*a*, through which the fourth pin joint pin 150*d* may be inserted. As further shown in FIG. 4E, the fifth pin joint 110*e* of each of the third links 116*a*, 116*b* has openings 136*b* at the second end 132*b*, through which the fifth pin joint pin 150*e* may be inserted.

As shown in FIG. 4E, the second pin joint 110*b* is positioned aft of the third pin joint 110*c*, and the second pin joint 110*b* is positioned at a distance to the trailing edge flap 38 that is less than a distance of the third pin joint 110*c* to the trailing edge flap 38. This allows for an increased moment arm 144 (see FIG. 4C) on the droop panel 40 (see FIG. 4E) and decreased loads on the first pin joint 110*a* (see FIG. 4E), the second pin joint 110*b* (see FIG. 4E), the third pin joint 110*c* (see FIG. 4E), the fourth pin joint 110*d* (see FIG. 4E), and the fifth pin joint 110*e* (see FIG. 4E).

As shown in FIGS. 4A, 4C, the system 10 may further comprise a control system 46. The control system 46 is preferably configured to control the pin joint linkage assembly 90 (see FIG. 4D) or the pin joint linkage assembly 90*a* (see FIG. 4E), to concurrently move the droop panel 40 and the trailing edge flap 38 to the deployed position 100, when the air vehicle 12 is in a takeoff mode or a landing mode, and as shown in FIG. 4A, to concurrently move the droop panel 40 and the trailing edge flap 38 to the stowed position 98, when the air vehicle 12 is in a cruise mode.

The control system 46 (see FIGS. 4A, 4C) may be operatively coupled via a control connection 47 (see FIGS. 4A, 4C) to the pin joint linkage assembly 90 (see FIG. 4D) or the pin joint linkage assembly 90*a* (see FIG. 4E). The control system 46 (see FIGS. 4A, 4C) is preferably configured to control the pin joint linkage assembly 90 (see FIG. 4D) or the pin joint linkage assembly 90*a* (see FIG. 4E) to move the droop panel 40 to a selected position, such as the stowed position 98 (see FIG. 4A), when the aircraft 12*a* (see FIG. 1) is in the cruise mode, and such as the deployed position 100 (see FIG. 4C), when the aircraft 12*a* (see FIG. 1) is in the takeoff mode or the landing mode.

The control system 46 (see FIGS. 4A, 4C) may be in the form of a mechanical control system such as having a lever or pneumatic device; an electrical control system such as having an electronic device with electronic controls; a digital control system such as having a computer or multi-function display; or another suitable control system. The control connection 47 (see FIGS. 4A, 4C) between the control system 46 (see FIGS. 4A, 4C) and the pin joint linkage assembly 90 (see FIGS. 4A, 4C), or the pin joint linkage assembly 90*a* (see FIG. 4E), may comprise a mechanical link; an electrical link such as an electrical cable, an optical cable, or another link configured to transmit electromagnetic signals between the control system 46 (see FIGS. 4A, 4C) and the pin joint linkage assembly 90, or the pin joint linkage assembly 90*a* (see FIG. 4E); a digital link; or another suitable link.

The control system 46 (see FIGS. 4A, 4C) may receive inputs from a pilot or other aircraft operator and may receive further inputs from one or more sensors (not shown). The pin joint linkage assembly 90 (see FIGS. 4A, 4C-4D), or the pin joint linkage assembly 90*a* (see FIG. 4E), further controls deployment and retraction of the trailing edge device 36 (see FIGS. 4A, 4C-4E), such as in the form of trailing edge flap 38 (see FIGS. 4A, 4C-4E).

As shown in FIGS. 4A-4E, the system 10 further comprises an integration space 140 located between the fixed structure 96 and the pin joint linkage assembly 90 (see FIG. 4D), or the pin joint linkage assembly 90*a* (see FIG. 4E), wherein the integration space 140 is configured for installation of one or more air vehicle systems 48 (see FIG. 1) comprising an electrical system such as including electrical wiring; a mechanical system such as including a torque tube; a hydraulic system such as including hydraulic tubing; or another air vehicle system. When the droop panel 40 (see FIGS. 4D-4E) and the trailing edge flap 38 (see FIGS. 4D-4E) are moved from the stowed position 98 (see FIGS. 4D-4E) to the deployed position 100 (see FIG. 4C) in the single coordinated motion by the pin joint linkage assembly 90 (see FIG. 4D), or the pin joint linkage assembly 90*a* (see FIG. 4E), the integration space 140 (see FIGS. 4D-4E) is preserved and cleared.

As shown in FIG. 4C, in the deployed position 100, an airflow gap 142 is created between the droop panel 40, such as in the form of spoiler 42, and the leading end 102 of the trailing edge flap 38. This allows an airflow to flow through the airflow gap 142.

As shown in FIGS. 4A-4B, the droop panel 40 is configured to be movable and is moved by the pin joint linkage assembly 90 (see also FIG. 4D), or the pin joint linkage assembly 90*a* (see FIG. 4E), between the stowed position 98 (see FIG. 4A) and the deployed position 100 (see FIG. 4C). The pin joint linkage assembly 90 (see FIG. 4D), or the pin joint linkage assembly 90*a* (see FIG. 4E), provides a load path to the droop panel 40 (see FIGS. 4A-4E).

The drooping of the droop panel 40 (see FIG. 4C) may improve airflow proximate to the wing 16 (see FIG. 4C), and the deployed trailing edge flap 38 (see FIG. 4C), as compared to when the droop panel 40 (see FIG. 4A) is not drooped. This improved airflow may improve low speed performance of the air vehicle 12 (see FIG. 1), such as in the form of aircraft 12*a* (see FIG. 1), which in turn, allows for improved takeoff and landing performance of the air vehicle 12 (see FIG. 1), such as in the form of aircraft 12*a* (see FIG.

1), by increasing lift, decreasing drag, and/or improving high angle of attack characteristics.

The droop panel 40 (see FIGS. 4A-4E) and the first pin joint 110a (see FIGS. 4A-4E) are preferably fixed in space by the supporting wing beam 43 (see FIGS. 4A-4E). As the trailing edge flap 38 (see FIGS. 4A-4E) rotates about its flap hinge line 39 (see FIG. 1), the fourth pin joint 110d/fifth pin joint 110e link (i.e., ED link) is pulled aft and down. This rotates the first pin joint 110a/second pin joint 110b/third pin joint 110c link (i.e., CBD link), lowering the droop panel 40 (see FIG. 4C).

The second pin joint 110b (see FIGS. 4A-4E) and the third pin joint 110c (see FIGS. 4A-4E) are separate to allow each joint to be a single pinned joint. This simplifies the integration of the integration space 140 (see FIGS. 4A-4E), and allows the second pin joint 110b (see FIGS. 4A-4E) to be located further aft, closer to the trailing edge flap 38 (see FIGS. 4A-4E). This also allows for a larger moment arm 144 (see FIG. 4C) on the droop panel 40 (see FIGS. 4A-4E), decreasing loads on the first pin joint 110a (see FIGS. 4A-4E), the second pin joint 110b (see FIGS. 4A-4E), the third pin joint 110c (see FIGS. 4A-4E), the fourth pin joint 110d (see FIGS. 4A-4E), and the fifth pin joint 110e (see FIGS. 4A-4E). This aft movement of the pin joint linkage assembly 90 (see FIG. 4D), or joint linkage assembly 90a (see FIG. 4E), also allows more clearance between the supporting wing beam 43 (see FIGS. 4A-4E) and the mechanism sweep. This allows more space for systems and components of systems to be incorporated and run, such as electrical wiring, hydraulic tubing, torque tubes, and other suitable systems and components of systems. The system 10 (see FIGS. 4A-4E) satisfies the gaps and overlaps requested for high speed and low speed performance.

Figure 5:
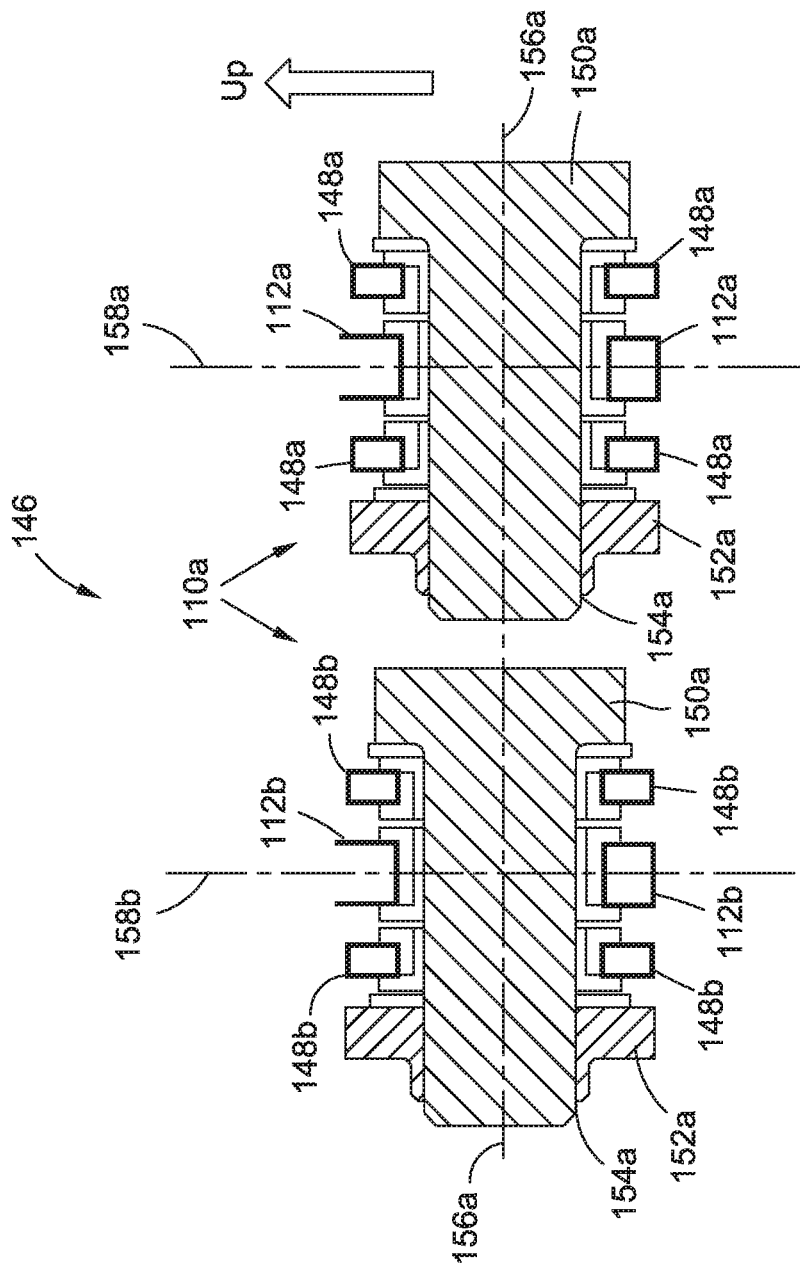
FIG. 5 is an illustration of a cross-sectional view taken along lines 5-5 of FIG. 4E.

FIG. 5 is an illustration of a cross-sectional view taken along lines 5-5 of FIG. 4E. FIG. 5 shows a first pin joint/supporting wing beam connection cross-section 146 of the first pin joint 110a and the supporting wing beam 43 (see FIG. 4E), and shows an up direction arrow for reference. As shown in FIG. 5, the first link 112a is attached to the supporting wing beam 43 (see also FIG. 4E) via one or more supporting wing beam fittings 148a centered about a centerline 156a of the first pin joint pin 150a. The first link 112b (see FIG. 5) is attached to the supporting wing beam 43 (see FIG. 4E) via one or more supporting wing beam fittings 148b (see FIG. 5) centered about the centerline 156a (see FIG. 5) of the first pin joint pin 150a (see FIG. 5).

As further shown in FIG. 5, the first pin joint pin 150a of each of the first links 112a, 112b is attached to a first pin joint pin attachment 152a via a through opening 154a. The first link 112a (see FIG. 5) has a centerline 158a (see FIG. 5), and the first link 112b (see FIG. 5) has a centerline 158b (see FIG. 5), that both run through respective first pin joint pins 150a.

Figure 6:
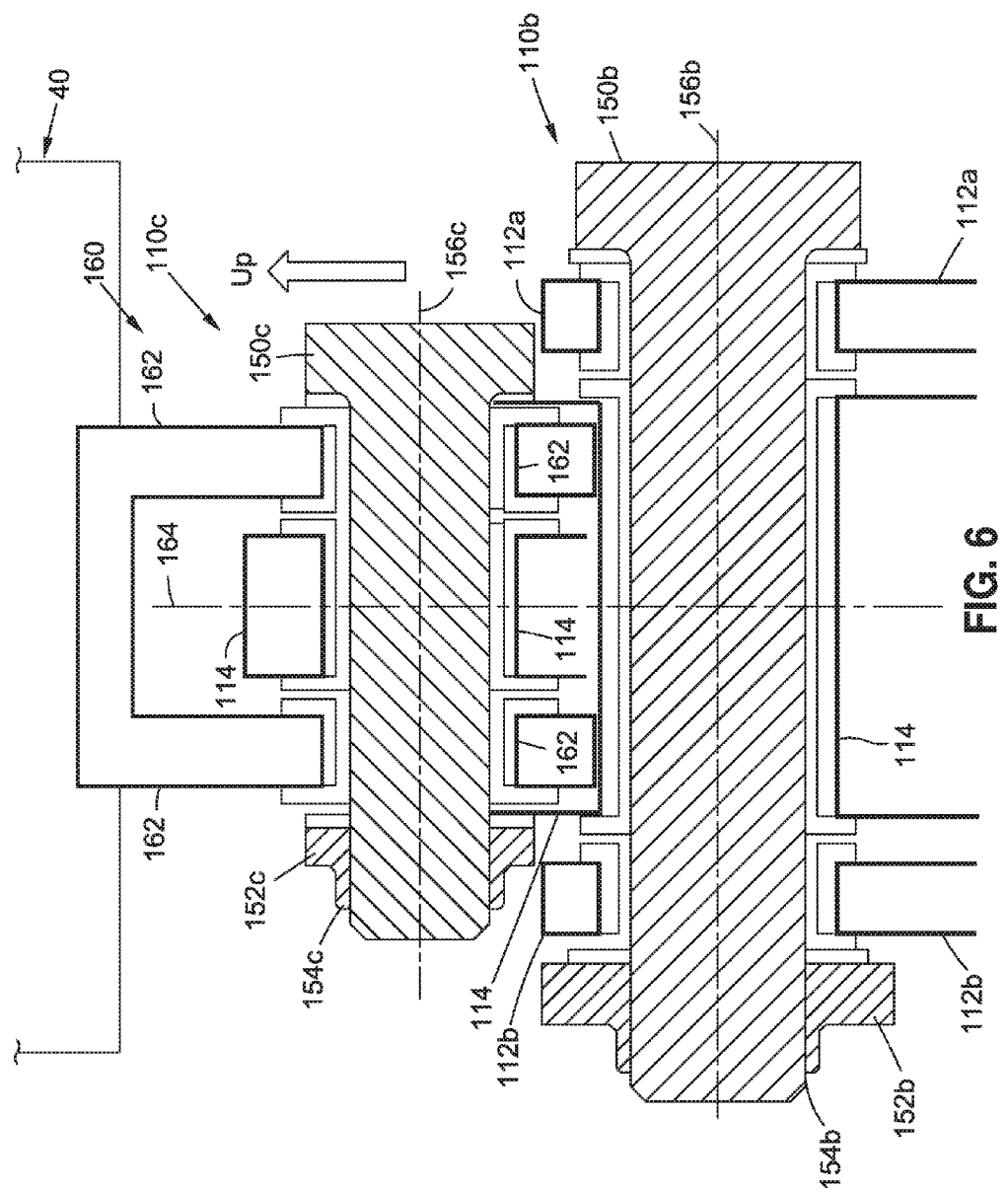
FIG. 6 is an illustration of a cross-sectional view taken along lines 6-6 of FIG. 4E.

FIG. 6 is an illustration of a cross-sectional view taken along lines 6-6 of FIG. 4E. FIG. 6 shows a second pin joint/third pin joint/droop panel connection cross-section 160 of the second pin joint 110b, the third pin joint 110c, and the droop panel 40 (see FIG. 4E), and shows an up direction arrow for reference. As shown in FIG. 6, the second link 114 is attached to the droop panel 40 (see also FIG. 4E) via one or more droop panel fittings 162 centered about a centerline 156b of the second pin joint pin 150b, and centered about a centerline 156c of the third pin joint pin 150c.

As further shown in FIG. 6, the second pin joint pin 150b of the second link 114 is attached to a second pin joint pin attachment 152b via a through opening 154b in the second pin joint pin attachment 152b. As further shown in FIG. 6, the third pin joint pin 150c of the second link 114 is attached to a third pin joint pin attachment 152c via a through opening 154c in the third pin joint pin attachment 152c. The second link 114 (see FIG. 6) has a centerline 164 (see FIG. 6) that runs through both the second pin joint pin 150b and the third pin joint pin 150c.

Figure 7:
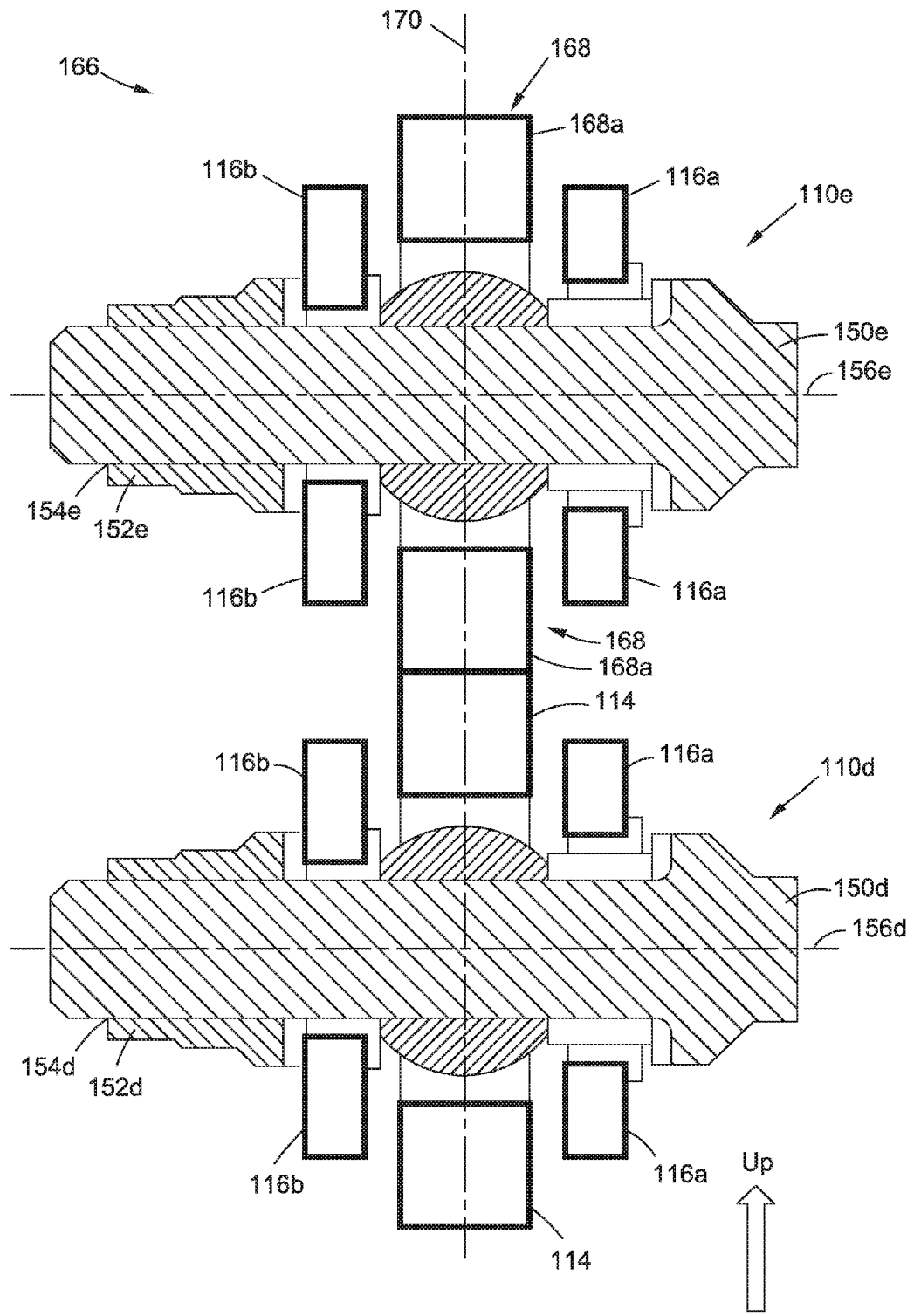
FIG. 7 is an illustration of a cross-sectional view taken along lines 7-7 of FIG. 4E.

FIG. 7 is an illustration of a cross-sectional view taken along lines 7-7 of FIG. 4E. FIG. 7 shows a fourth pin joint/fifth pin joint/trailing edge flap connection cross-section 166 of the fourth pin joint 110d, the fifth pin joint 110e, and the trailing edge flap 38 (see FIG. 4E), and shows an up direction arrow for reference. As shown in FIG. 7, the third links 116a, 116b are attached to the trailing edge flap 38 (see also FIG. 4E) via one or more trailing edge flap fittings 168, such as in the form of inboard trailing edge flap fittings 168a.

For the fourth pin joint 110d (see FIGS. 4E, 7), the third links 116a, 116b (see FIG. 7) are attached to the second link 114 (see FIG. 7). As shown in FIG. 7, the fourth pin joint pin 150d of the third links 116a, 116b is attached to a fourth pin joint pin attachment 152d via a through opening 154d in the fourth pin joint pin attachment 152d. The fourth pin joint pin 150d (see FIG. 7) has a fourth pin joint pin centerline 156d (see FIG. 7).

As shown in FIG. 7, for the fifth pin joint 110e, the third links 116a, 116b are also attached to the trailing edge flap 38 (see also FIG. 4E) via one or more trailing edge flap fittings 168, such as in the form of inboard trailing edge flap fittings 168a. As further shown in FIG. 7, the fifth pin joint pin 150e of the third links 116a, 116b is attached to a fifth pin joint pin attachment 152e via a through opening 154e in the fifth pin joint pin attachment 152e. The fifth pin joint pin 150e (see FIG. 7) has a fifth pin joint pin centerline 156e (see FIG. 7).

The third links 116a, 116b (see FIG. 7) have a centerline 170 (see FIG. 7) that runs through both the fourth pin joint pin 150d (see FIG. 7) and the fifth pin joint pin 150e (see FIG. 7). The centerline 170 (see FIG. 7) also runs through the trailing edge flap fittings 168 (see FIG. 7) and the second link 114 (see FIG. 7).

FIG. 8A is an illustrations of a partial cross-sectional side view of an embodiment of the system 10 of the disclosure having a trailing edge variable camber (TEVC) system 172, where the TEVC system 172 is in a stowed position 174. FIG. 8B is an illustration of a partial cross-sectional side view of the system of FIG. 8A with the trailing edge variable camber (TEVC) system 172 in an up position 176. The pin joint linkage assembly 90 (see FIGS. 8A-8B) is preferably configured to provide clearance for the up position 176 (see FIG. 8B) of TEVC system 172 (see FIG. 8B). Pin joint linkage assembly 90a (see FIG. 4E) is also preferably configured to provide clearance for the up position 176 (see FIG. 8B) of TEVC system 172 (see FIG. 8B).

As shown in FIGS. 8A-8B, the droop panel 40, such as in the form of the inboard droop panel 40a, is positioned between the supporting wing beam 43 on the wing 16 and a trailing edge device 36, such as a trailing edge flap 38, for example, an inboard trailing edge flap 38a, on the wing 16. FIGS. 8A-8B show the system 10 comprising the pin joint linkage assembly 90 operatively coupled between the supporting wing beam 43 and the trailing edge flap 38. Alternatively, the system 10 (see FIGS. 8A-8B) having the TEVC system 172 (see FIGS. 8A-8B) may comprise pin joint linkage assembly 90a (see FIG. 4E) operatively coupled between the supporting wing beam 43 (see FIGS. 8A-8B) and the trailing edge flap 38 (see FIGS. 8A-8B).

FIGS. 8A-8B further show the pin joint linkage assembly 90 with the first link 112, the second link 114 with the angled portion 128 (see FIG. 8B), the third link 116, the first pin joint 110*a*, the second pin joint 110*b*, the third pin joint 110*c*, the fourth pin joint 110*d*, and the fifth pin joint 110*e*. Alternatively, the system 10 (see FIGS. 8A-8B) having the TEVC system 172 (see FIGS. 8A-8B) may comprise pin joint linkage assembly 90*a* (see FIG. 4E).

In another embodiment of the disclosure, there is provided an aircraft 12*a* (see FIG. 1). The aircraft 12*a* (see FIG. 1) comprises a fuselage 14 (see FIG. 1) and at least one wing 16 (see FIG. 1) coupled to the fuselage 14 (see FIG. 1). The at least one wing 16 (see FIG. 1) has a leading edge 22 (see FIG. 1), a trailing edge 24 (see FIG. 1), and a fixed structure 96 (see FIG. 4A), such as in the form of a supporting wing beam 43 (see FIG. 4A) between the leading edge 22 (see FIG. 1) and the trailing edge 24 (see FIG. 1). The aircraft 12*a* (see FIG. 1) further comprises a trailing edge flap 38 (see FIGS. 1, 4A) coupled to the trailing edge 24 (see FIG. 1) and being movable relative to the at least one wing 16 (see FIG. 1) between a stowed position 98 (see FIG. 4A) and a deployed position 100 (see FIG. 4C). The trailing edge flap 38 (see FIGS. 1, 4A) is preferably rotated about a flap hinge line 39 (see FIG. 1) to pull the third link 116 (see FIG. 4C) in an aft direction and a downward direction, thus rotating and pulling the second link 114 (see FIG. 4C) in the aft direction and drooping the droop panel 40 (see FIG. 4C) in the downward direction.

The aircraft 12*a* (see FIG. 1) further comprises a droop panel operation system 10 (see FIGS. 4A-4E) coupled between the fixed structure 96 (see FIG. 4A) and the trailing edge flap 38 (see FIG. 4A). The droop panel operation system 10 (see FIGS. 4A-4E) comprises a droop panel 40 (see FIGS. 4A-4E) positioned on a wing upper surface 28 (see FIG. 1) and forward of the trailing edge flap 38 (see FIGS. 4A-4E). The droop panel operation system 10 (see FIGS. 4A-4E) further comprises a pin joint linkage assembly 90 (see FIGS. 4A-4D), or pin joint linkage assembly 90*a* (see FIG. 4E) operatively coupled between and to the fixed structure 96 (see FIG. 4A), the droop panel 40 (see FIGS. 4A-4E), and the trailing edge flap 38 (see FIGS. 4A-4E).

As discussed in further detail above, in one embodiment, the pin joint linkage assembly 90 (see FIGS. 4A-4D) comprises the first link 112 (see FIG. 4D) having first pin joint 110*a* (see FIGS. 4A-4D) at first end 118*a* fixedly attached to the fixed structure 96 (see FIGS. 4A-4C), and having second pin joint 110*b* (see FIGS. 4A-4D) at second end 118*b* (see FIGS. 4B, 4D).

The pin joint linkage assembly 90 (see FIGS. 4A-4D) further comprises the second link 114 (see FIGS. 4B-4D) coupled to the first link 112 (see FIG. 4D). The second link 114 (see FIGS. 4B-4D) has first end 124*a* (see FIGS. 4A-4D) pivotably connected to the third pin joint 110*c* (see FIGS. 4B-4D). The second link 114 (see FIGS. 4B-4D) further has second end 124*b* (see FIGS. 4A-4D) connected to the fourth pin joint 110*d* (see FIGS. 4A-4D). The second link 114 (see FIGS. 4B-4D) further has angled portion 128 (see FIG. 4B) pivotably connected to the second pin joint 110*b* (see FIGS. 4B-4D) and positioned between the first and second ends 124*a*, 124*b* (see FIGS. 4A-4D), of the second link 114 (see FIGS. 4B-4D).

The pin joint linkage assembly 90 (see FIGS. 4A-4D) further comprises the third link 116 (see FIG. 4D) coupled to the second link 114 (see FIG. 4D). The third link 116 (see FIG. 4D) has first end 132*a* (see FIGS. 4A-4C) coupled to the fourth pin joint 110*d* (see FIGS. 4A-4D), and has second end 132*b* (see FIGS. 4A-4C) coupled to a fifth pin joint 110*e* (see FIGS. 4A-4D) fixedly attached to the trailing edge flap 38 (see FIGS. 4A-4D). Preferably, the fifth pin joint 110*e* (see FIGS. 4A-4D) is fixedly attached to the bullnose portion 108 (see FIGS. 4A-4D) of the trailing edge flap 38 (see FIGS. 4A-4D).

As discussed in further detail above, in another embodiment, the pin joint linkage assembly 90*a* (see FIG. 4E) comprises the pair of first links 112*a*, 112*b*, each having the first pin joint 110*a* at the first end 118*a* fixedly attached to the fixed structure 96, and each having the second end 118*b* coupled to the second pin joint 110*b* positioned between the pair of first links 112*a*, 112*b*.

As further shown in FIG. 4E, the pin joint linkage assembly 90*a* further comprises the second link 114 (see also FIGS. 4B-4D) coupled to the pair of first links 112*a*, 112*b* and positioned substantially between the pair of first links 112*a*, 112*b*. The second link 114 (see FIG. 4E) has the first end 124*a* (see FIG. 4E) pivotably connected to the third pin joint 110*c* (see FIG. 4E). The second link 114 (see FIG. 4E) further has the second end 124*b* (see FIG. 4E) connected to the fourth pin joint 110*d* (see FIG. 4E). The second link 114 (see FIG. 4E) further has the angled portion 128 (see FIG. 4B) pivotably connected to the second pin joint 110*b* (see FIGS. 4B, 4E) and positioned between the first and second ends 124*a*, 124*b* (see FIGS. 4E), of the second link 114 (see FIG. 4E).

The pin joint linkage assembly 90 (see FIG. 4E) further comprises the pair of third links 116*a*, 116*b* (see FIG. 4E) coupled to the second link 114 (see FIG. 4E). The third links 116*a*, 116*b* (see FIG. 4E) each have the fourth pin joint 110*d* (see FIG. 4E) at the first end 132*a* (see FIG. 4E). The second end 124*b* (see FIG. 4E) of the second link 114 (see FIG. 4E) is positioned between the first ends 132*a* (see FIG. 4E) of the pair of third links 116*a*, 116*b* (see FIG. 4E). Each of the third links 116*a*, 116*b* (see FIG. 4E) further has the second end 132*b* (see FIG. 4E) coupled to a fifth pin joint 110*e* (see FIG. 4E) fixedly attached to the trailing edge flap 38 (see FIG. 4E). Preferably, the fifth pin joint 110*e* (see FIG. 4E) is fixedly attached to the bullnose portion 108 (see FIG. 4E) of the trailing edge flap 38 (see FIG. 4E).

The aircraft 12*a* (see FIG. 1) further comprises control system 46 (see FIGS. 1, 4A) operatively coupled to the pin joint linkage assembly 90 (see FIG. 4D), or pin joint linkage assembly 90*a* (see FIG. 4E). The control system 46 (see FIGS. 1, 4A) is configured to control the pin joint linkage assembly 90 (see FIG. 4D), or pin joint linkage assembly 90*a* (see FIG. 4E), to operate the droop panel 40 (see FIGS. 4D-4E) by concurrently moving both the droop panel 40 (see FIGS. 4D-4E) and the trailing edge flap 38 (see FIG. 4D-4E) from the stowed position 98 (see FIG. 4A) to the deployed position 100 (see FIG. 4C) in a single coordinated motion, thus allowing the droop panel 40 (see FIGS. 4D-4E) to be driven off the trailing edge flap 38 (see FIGS. 4D-4E) without use of a motor (not shown), where the motor may, for example, be hydraulic powered or electric powered.

The control system 46 (see FIG. 4A) is operatively configured to control the pin joint linkage assembly 90 (see FIG. 4D), or the pin joint linkage assembly 90*a* (see FIG. 4E), to move the droop panel 40 (see FIGS. 4D-4E) to the stowed position 98 (see FIG. 4A), when the aircraft 12*a* (see FIG. 1) is in a cruise mode, and to move the droop panel 40 (see FIG. 4C) to the deployed position 100 (see FIG. 4C), when the aircraft 12*a* (see FIG. 1) is in a takeoff mode or a landing mode.

The droop panel operation system 10 (see FIGS. 4A-4E) further comprises an integration space 140 (see FIGS. 4A-4E) located between the fixed structure 96 (see FIGS. 4A-4C) and the pin joint linkage assembly 90 (see FIG. 4D), or the pin joint linkage assembly 90*a* (see FIG. 4E). The integration space 140 (see FIGS. 4A-4E) is preferably configured for receiving installation of one or more aircraft systems 48 (see FIG. 1) comprising an electrical system such as including electrical wiring; a mechanical system such as including a torque tube; a hydraulic system such as including hydraulic tubing; or another suitable aircraft system 48 (see FIG. 1). The integration space 140 (see FIGS. 4A-4E) is preferably preserved and cleared when the droop panel 40 (see FIGS. 4A-4E) and the trailing edge flap 38 (see FIGS. 4A-4E) are moved from the stowed position 98 (see FIG. 4A) to the deployed position 100 (see FIG. 4C) in the single coordinated motion by the pin joint linkage assembly 90 (see FIG. 4D), or the pin joint linkage assembly 90*a* (see FIG. 4E).

The fixed structure 96 (see FIG. 4A) preferably comprises a supporting wing beam 43 (see FIGS. 4A-4E). The droop panel 40 (see FIGS. 4A-4E) preferably comprises an inboard droop panel 40*a* (see FIGS. 4A-4E) movable by the pin joint linkage assembly 90 (see FIG. 4D), or the pin joint linkage assembly 90*a* (see FIG. 4E), between the stowed position 98 (see FIG. 4A) and the deployed position 100 (see FIG. 4C). The trailing edge flap 38 (see FIGS. 4A-4E) preferably comprises an inboard trailing edge flap 38*a* (see FIGS. 4A-4E) movable by the pin joint linkage assembly 90 (see FIG. 4D), or the pin joint linkage assembly 90*a* (see FIG. 4E), between the stowed position 98 (see FIG. 4A) and the deployed position 100 (see FIG. 4C).

The second pin joint 110*b* (see FIGS. 4A-4E) is preferably positioned aft of the third pin joint 110*c* (see FIGS. 4A-4E), and the second pin joint 110*b* (see FIGS. 4A-4E) is preferably positioned at a distance to the trailing edge flap 38 (see FIGS. 4A-4E) that is less than a distance of the third pin joint 110*c* (see FIGS. 4A-4E) to the trailing edge flap 38 (see FIGS. 4A-4E). This allows for an increased moment arm 144 (see FIG. 4C) on the droop panel 40 (see FIG. 4C) and decreased loads on the first pin joint 110*a* (see FIGS. 4A-4E), the second pin joint 110*b* (see FIGS. 4A-4E), the third pin joint 110*c* (see FIGS. 4A-4E), the fourth pin joint 110*d* (see FIGS. 4A-4E), and the fifth pin joint 110*e* (see FIGS. 4A-4E).

The pin joint linkage assembly 90 (see FIGS. 4A-4D), or the pin joint linkage assembly 90*a* (see FIG. 4E), of the aircraft 12*a* (see FIG. 1A) is preferably operatively configured to provide clearance for an up position 176 (see FIG. 8B) of the trailing edge variable camber (TEVC) system 172 (see FIGS. 8A-8B).

Figure 9:
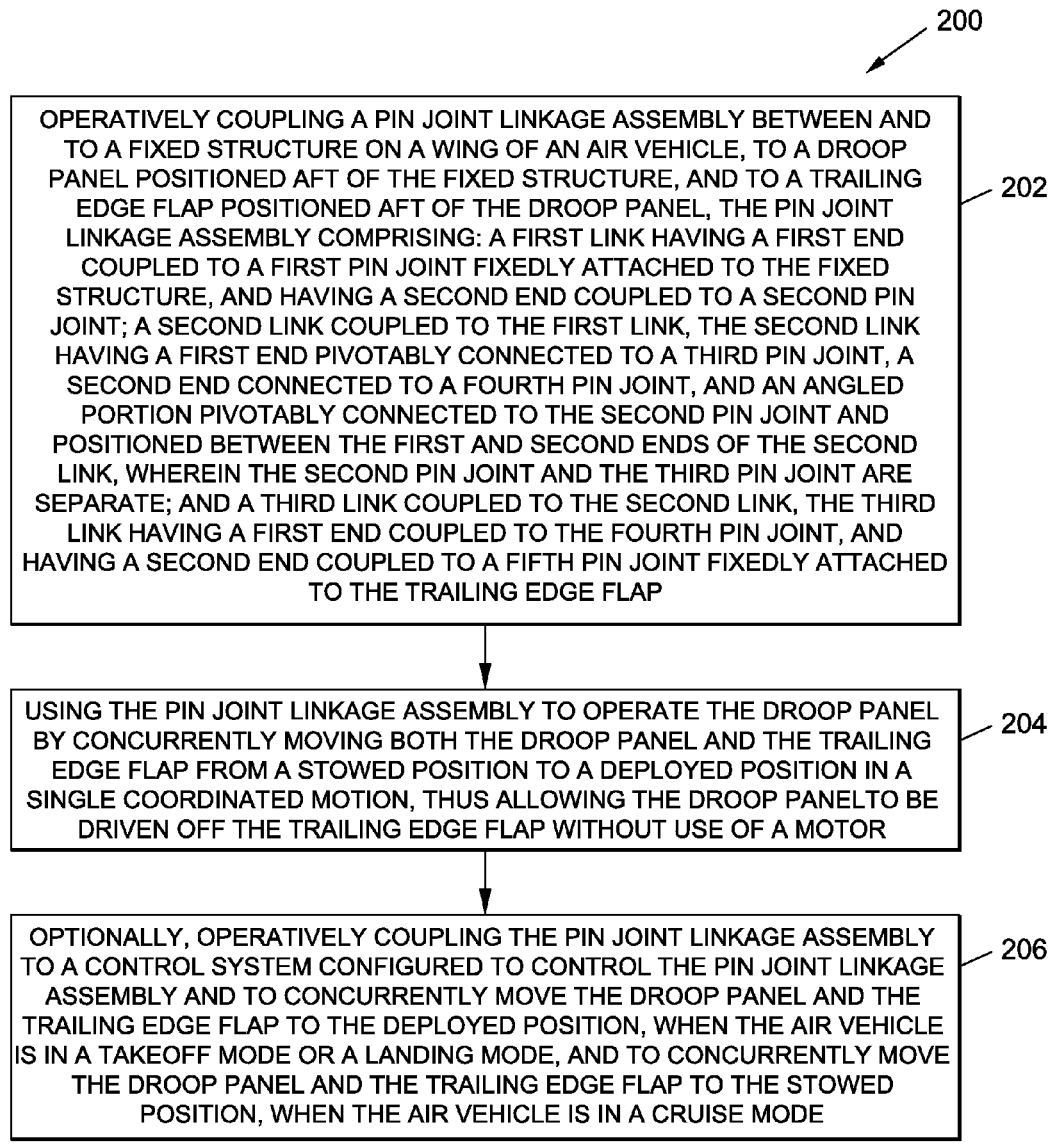

In another embodiment of the disclosure, there is provided a method 200 for operating a droop panel 40 (see FIGS. 4A-4E) on an air vehicle 12 (see FIG. 1). FIG. 9 is an illustration of a flow diagram of an exemplary embodiment of the method 200 of the disclosure.

As shown in FIG. 9, the method 200 comprises step 202 of operatively coupling a pin joint linkage assembly 90 (see FIG. 4D), or a pin joint linkage assembly 90*a* (see FIG. 4E), between and to the fixed structure 96 (see FIG. 4A) on the wing 16 (see FIG. 1) of the air vehicle 12 (see FIG. 1), to a droop panel 40 (see FIGS. 4A-4E) positioned aft of the fixed structure 96 (see FIG. 4A), and to the trailing edge flap 38 (see FIGS. 4A-4E) positioned aft of the droop panel 40 (see FIGS. 4A-4E).

The step 202 of operatively coupling the pin joint linkage assembly 90 (see FIGS. 4A-4D), or the pin joint linkage assembly 90*a* (see FIG. 4E), preferably comprises operatively coupling the pin joint linkage assembly 90 (see FIGS. 4A-4D), or the pin joint linkage assembly 90*a* (see FIG. 4E), between and to the fixed structure 96 (see FIG. 4A) comprising the supporting wing beam 43 (see FIGS. 4A-4E), to the droop panel 40 (see FIGS. 4A-4E) comprising the inboard droop panel 40*a* (see FIGS. 4A-4E), positioned aft of the supporting wing beam 43 (see FIGS. 4A-4E), and to the trailing edge flap 38 (see FIGS. 4A-4E) comprising an inboard trailing edge flap 38*a* (see FIGS. 4A-4E), positioned aft of the inboard droop panel 40*a* (see FIGS. 4A-4E).

As discussed in further detail above, in one embodiment, the pin joint linkage assembly 90 (see FIGS. 4A-4D) comprises the first link 112 (see FIG. 4D) having first pin joint 110*a* (see FIGS. 4A-4D) at first end 118*a* fixedly attached to the fixed structure 96 (see FIGS. 4A-4C), and having second pin joint 110*b* (see FIGS. 4A-4D) at second end 118*b* (see FIGS. 4B, 4D).

The pin joint linkage assembly 90 (see FIGS. 4A-4D) further comprises the second link 114 (see FIGS. 4B-4D) coupled to the first link 112 (see FIG. 4D). The second link 114 (see FIGS. 4B-4D) has first end 124*a* (see FIGS. 4A-4D) pivotably connected to the third pin joint 110*c* (see FIGS. 4B-4D). The second link 114 (see FIGS. 4B-4D) further has second end 124*b* (see FIGS. 4A-4D) connected to the fourth pin joint 110*d* (see FIGS. 4A-4D). The second link 114 (see FIGS. 4B-4D) further has angled portion 128 (see FIG. 4B) pivotably connected to the second pin joint 110*b* (see FIGS. 4B-4D) and positioned between the first and second ends 124*a*, 124*b* (see FIGS. 4A-4D), of the second link 114 (see FIGS. 4B-4D).

The pin joint linkage assembly 90 (see FIGS. 4A-4D) further comprises the third link 116 (see FIG. 4D) coupled to the second link 114 (see FIG. 4D). The third link 116 (see FIG. 4D) has first end 132*a* (see FIGS. 4A-4C) coupled to the fourth pin joint 110*d* (see FIGS. 4A-4D), and has second end 132*b* (see FIGS. 4A-4C) coupled to a fifth pin joint 110*e* (see FIGS. 4A-4D) fixedly attached to the trailing edge flap 38 (see FIGS. 4A-4D). Preferably, the fifth pin joint 110*e* (see FIGS. 4A-4D) is fixedly attached to the bullnose portion 108 (see FIGS. 4A-4D) of the trailing edge flap 38 (see FIGS. 4A-4D).

As discussed in further detail above, in another embodiment, the pin joint linkage assembly 90*a* (see FIG. 4E) comprises the pair of first links 112*a*, 112*b*, each having the first pin joint 110*a* at the first end 118*a* fixedly attached to the fixed structure 96, and each having the second end 118*b* coupled to the second pin joint 110*b* positioned between the pair of first links 112*a*, 112*b*.

As further shown in FIG. 4E, the pin joint linkage assembly 90*a* further comprises the second link 114 (see also FIGS. 4B-4D) coupled to the pair of first links 112*a*, 112*b* and positioned substantially between the pair of first links 112*a*, 112*b*. The second link 114 (see FIG. 4E) has the first end 124*a* (see FIG. 4E) pivotably connected to the third pin joint 110*c* (see FIG. 4E). The second link 114 (see FIG. 4E) further has the second end 124*b* (see FIG. 4E) connected to the fourth pin joint 110*d* (see FIG. 4E). The second link 114 (see FIG. 4E) further has the angled portion 128 (see FIG. 4B) pivotably connected to the second pin joint 110*b* (see FIGS. 4B, 4E) and positioned between the first and second ends 124*a*, 124*b* (see FIG. 4E), of the second link 114 (see FIG. 4E).

The pin joint linkage assembly 90 (see FIG. 4E) further comprises the pair of third links 116*a*, 116*b* (see FIG. 4E) coupled to the second link 114 (see FIG. 4E). The third links 116*a*, 116*b* (see FIG. 4E) each have the fourth pin joint 110*d* (see FIG. 4E) at the first end 132*a* (see FIG. 4E). The second end 124*b* (see FIG. 4E) of the second link 114 (see FIG. 4E) is positioned between the first ends 132*a* (see FIG. 4E) of the pair of third links 116*a*, 116*b* (see FIG. 4E). Each of the third links 116*a*, 116*b* (see FIG. 4E) further has the second end 132b (see FIG. 4E) coupled to a fifth pin joint 110e (see FIG. 4E) fixedly attached to the trailing edge flap 38 (see FIG. 4E). Preferably, the fifth pin joint 110e (see FIG. 4E) is fixedly attached to the bullnose portion 108 (see FIG. 4E) of the trailing edge flap 38 (see FIG. 4E).

As shown in FIG. 9, the method 200 further comprises step 204 of using the pin joint linkage assembly 90 (see FIG. 4D), or the pin joint linkage assembly 90a (see FIG. 4E), to operate the droop panel 40 (see FIGS. 4A-4E) by concurrently moving both the droop panel 40 (see FIGS. 4A-4E) and the trailing edge flap 38 (see FIGS. 4A-4E) from the stowed position 98 (see FIG. 4A) to the deployed position 100 (see FIG. 4C) in a single coordinated motion, thus allowing the droop panel 40 (see FIGS. 4A-4E) to be driven off the trailing edge flap 38 (see FIGS. 4A-4E) without use of a motor (not shown), where the motor may be, for example, hydraulic powered or electric powered.

The step 204 of using the pin joint linkage assembly 90 (see FIG. 4D), or the pin joint linkage assembly 90a (see FIG. 4E), to concurrently move the droop panel 40 (see FIGS. 4A-4E) and the trailing edge flap 38 (see FIGS. 4A-4E) from the stowed position 98 (see FIG. 4A) to the deployed position 100 (see FIG. 4C) preferably comprises opening an airflow gap 142 (see FIG. 4C) between the trailing edge flap 38 (see FIGS. 4A-4E) and the droop panel 40 (see FIGS. 4A-4E), and minimizing with the pin joint linkage assembly 90 (see FIG. 4D), or the pin joint linkage assembly 90a (see FIG. 4E), any aerodynamic interference created by the airflow gap 142 (see FIG. 4C).

The step 204 of using the pin joint linkage assembly 90 (see FIG. 4D), or the pin joint linkage assembly 90a (see FIG. 4E), to concurrently move the droop panel 40 (see FIGS. 4A-4E) and the trailing edge flap 38 (see FIGS. 4A-4E) further comprises rotating the trailing edge flap 38 (see FIGS. 1, 4A-4E) about a flap hinge line 39 (see FIG. 1) to pull the third link 116 (see FIG. 4D) or the pair of third links 116a, 116b (see FIG. 4E), in an aft direction and a downward direction, thus rotating and pulling the second link 114 (see FIGS. 4A-4E) in the aft direction and drooping the droop panel 40 (see FIGS. 4A-4E) in the downward direction.

Pulling the third link 116 (see FIG. 4D) or the pair of third links 116a, 116b (see FIG. 4E), in the aft direction, and rotating and pulling the second link 114 (see FIGS. 4A-4E) in the aft direction, allow for preservation and clearance of the integration space 140 (see FIGS. 4A-4E) between the fixed structure 96 (see FIGS. 4A-4C) and the pin joint linkage assembly 90 (see FIG. 4D), or the pin joint linkage assembly 90a (see FIG. 4E). The integration space 140 (see FIGS. 4A-4E) is preferably configured for installation of one or more air vehicle systems 48 (see FIG. 1) comprising an electrical system such as including electrical wiring; a mechanical system such as including a torque tube; a hydraulic system such as including hydraulic tubing; or another suitable air vehicle system 48 (see FIG. 1).

As shown in FIG. 9, the method 200 may further comprise optional step 206 of operatively coupling the pin joint linkage assembly 90 (see FIG. 4), or the pin joint linkage assembly 90a (see FIG. 4E), to a control system 46 (see FIG. 4A) configured to control the pin joint linkage assembly 90 (see FIG. 4D), or the pin joint linkage assembly 90a (see FIG. 4E), and to concurrently move the droop panel 40 (see FIGS. 4A-4E) and the trailing edge flap 38 (see FIGS. 4A-4E) to the deployed position 100 (see FIG. 4C), when the air vehicle 12 (see FIG. 1) is in a takeoff mode or a landing mode, and to concurrently move the droop panel 40 (see FIGS. 4A-4E) and the trailing edge flap 38 (see FIGS. 4A-4E) to the stowed position 98 (see FIG. 4A), when the air vehicle 12 (see FIG. 1) is in a cruise mode.

The method 200 may further optionally comprise using the pin joint linkage assembly 90 (see FIG. 4D), or the pin joint linkage assembly 90a (see FIG. 4E), to provide clearance for an up position 176 (see FIG. 8B) of the trailing edge variable camber (TEVC) system 172 (see FIGS. 8A-8B).

As will be appreciated by those of skill in the art, incorporating the novel system 10 (see FIGS. 4A-4E) into the wing 16 (see FIG. 1) of an air vehicle 12 (see FIG. 1), such as in the form of aircraft 12a (see FIG. 1), results in a number of substantial benefits. Disclosed embodiments of the system 10 (see FIGS. 4A-4E) and method 200 (see FIG. 9) coordinate motion between the trailing edge flap 38 (see FIGS. 4A-4E), such as the inboard trailing edge flap 38a (see FIGS. 4A-4E), and the droop panel 40 (see FIGS. 4A-4E), such as the inboard droop panel 40a (see FIGS. 4A-4E).

Moreover, disclosed embodiments of the system 10 (see FIGS. 4A-4E) and method 200 (see FIG. 9) make use of simple, separate, and single pinned joints, such as the first pin joint 110a (see FIGS. 4A-4E), the second pin joint 110b (see FIGS. 4A-4E), the third pin joint 110c (see FIGS. 4A-4E), the fourth pin joint 110d (see FIGS. 4A-4E), and the fifth pin joint 110e (see FIGS. 4A-4E), and do not use an eccentric link. In addition, the system 10 (see FIGS. 4A-4E) and method 200 (see FIG. 9) allow the droop panel 40 (see FIGS. 4A-4E), such as the inboard droop panel 40a (see FIGS. 4A-4E), to be driven off of the trailing edge flap 38 (see FIGS. 4A-4E), such as the inboard trailing edge flap 38a (see FIGS. 4A-4E), using a simple pin joint linkage assembly 90 (see FIG. 4D), or pin joint linkage assembly 90a (see FIG. 4E), in place of a motor (not shown), where the motor may be, for example, hydraulic powered or electric powered. The design of the system 10 (see FIGS. 4A-4E) and method 200 (see FIG. 9) removes the need for a motor (not shown), where the motor may be, for example, hydraulic powered or electric powered, which would operate the inboard droop panel 40a (see FIGS. 4A-4E) separately from the trailing edge flap actuation mechanism and provides low speed performance to an air vehicle 12 (see FIG. 1) without actuation.

Further, disclosed embodiments of the system 10 (see FIGS. 4A-4E) and method 200 (see FIG. 9) meet the high speed and low speed gaps and overlaps, thus improving takeoff and landing performance. Moreover, disclosed embodiments of the system 10 (see FIGS. 4A-4E) and method 200 (see FIG. 9) allow for simpler joints, less structural weight, reduced loads, reduced part count, reduced integration complexity and easier assembly, which in turn, may result in decreased manufacturing and assembly costs, and better clearance for an up position of a trailing edge variable camber (TEVC) system 172 (see FIGS. 8A-8B). In addition, disclosed embodiments of the system 10 (see FIGS. 4A-4E) and method 200 (see FIG. 9) allow greater and improved integration space 140 (see FIGS. 4A-4E) for systems integration of one or more aircraft systems 48 (see FIG. 1).

The distance 138 (see FIGS. 4D-4E) between the second pin joint 110b (see FIGS. 4D-4E) and the third pin joint 110c (see FIGS. 4D-4E) is preferably increased to allow for two pins to be installed. The system 10 (see FIGS. 4A-4E) preferably has a lighter weight configuration because the third pin joint 110c/second pin joint 110b/fourth pin joint 110d link (see FIGS. 4A-4E) (i.e., CBD link) is smaller and less material is used. This results in the second pin joint 110b (see FIGS. 4A-4E) (i.e., the B joint) on the first pin joint 110a/second pin joint 110b link (i.e., AB link) also decreasing in diameter. This is lighter weight and allows for improved integration space 140 (see FIGS. 4A-4E). Because the second pin joint 110b (see FIGS. 4A-4E) (i.e., B joint) is much smaller, the third pin joint 110c (see FIGS. 4A-4E) (i.e., C joint) may be located further aft, increasing the moment arm 144 (see FIG. 4C) on the droop panel 40 (see FIGS. 4A-4E). This allows for the load on this joint to decrease, thus decreasing the pin diameters throughout the mechanism. Smaller pins mean less weight and more integration space 140 (see FIGS. 4A-4E). The simpler joint configuration at the second pin joint 110b (see FIGS. 4A-4E) and the third pin joint 110c (see FIGS. 4A-4D) allows for easier assembly and manufacturing.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A system for operating a droop panel on an air vehicle, the system comprising:
    a droop panel on a wing of the air vehicle, the droop panel positioned between a fixed structure on the wing and a trailing edge flap on the wing;
    a pin joint linkage assembly operatively coupled between and to the fixed structure, the droop panel, and the trailing edge flap, the pin joint linkage assembly comprising:
        a first link having a first end coupled to a first pin joint fixedly attached to the fixed structure, and having a second end coupled to a second pin joint;
        a second link coupled to the first link, the second link having a first end pivotably connected to a third pin joint, a second end connected to a fourth pin joint, and an angled portion pivotably connected to the second pin joint and positioned between the first and second ends of the second link, wherein the second pin joint and the third pin joint are separate; and
        a third link coupled to the second link, the third link having a first end coupled to the fourth pin joint, and having a second end coupled to a fifth pin joint fixedly attached to the trailing edge flap,
    wherein the pin joint linkage assembly is configured to operate the droop panel by concurrently moving both the droop panel and the trailing edge flap from a stowed position to a deployed position in a single coordinated motion, thus allowing the droop panel to be driven off the trailing edge flap without use of a motor.

2. The system of claim 1 further comprising a control system configured to control the pin joint linkage assembly to concurrently move the droop panel and the trailing edge flap to the deployed position, when the air vehicle is in a takeoff mode or a landing mode, and to concurrently move the droop panel and the trailing edge flap to the stowed position, when the air vehicle is in a cruise mode.

3. The system of claim 1 further comprising an integration space located between the fixed structure and the pin joint linkage assembly, wherein the integration space is configured for installation of one or more air vehicle systems comprising an electrical system, a mechanical system, and a hydraulic system.

4. The system of claim 3 wherein the integration space is preserved and cleared when the droop panel and the trailing edge flap are moved from the stowed position to the deployed position in the single coordinated motion by the pin joint linkage assembly.

5. The system of claim 1 wherein the fixed structure comprises a supporting wing beam.

6. The system of claim 1 wherein the droop panel comprises an inboard droop panel movable by the pin joint linkage assembly between the stowed position and the deployed position.

7. The system of claim 1 wherein the trailing edge flap comprises an inboard trailing edge flap movable by the pin joint linkage assembly between the stowed position and the deployed position.

8. The system of claim 1 wherein the second pin joint is positioned aft of the third pin joint and is positioned at a distance to the trailing edge flap that is less than a distance of the third pin joint to the trailing edge flap, to allow for an increased moment arm on the droop panel and decreased loads on the first pin joint, the second pin joint, the third pin joint, the fourth pin joint, and the fifth pin joint.

9. The system of claim 1 wherein the pin joint linkage assembly comprises:
    the first link comprising a pair of first links wherein each individual of the pair of first links has a first end coupled to the first pin joint fixedly attached to the fixed structure, and further wherein each individual of the pair of first links has a second end coupled to the second pin joint positioned between the pair of first links;
    the second link coupled to the pair of first links and positioned substantially between the pair of first links, the second link having the first end pivotably connected to the third pin joint, the second end connected to the fourth pin joint, and the angled portion pivotably connected to the second pin joint and positioned between the first and second ends of the second link, wherein the second pin joint and the third pin joint are separate; and
    the third link comprising a pair of third links coupled to the second link, wherein each individual of the pair of third links has a first end coupled to the fourth pin joint, so that the second end of the second link is positioned between the pair of third links, and further wherein each individual of the pair of third links has a second end coupled to the fifth pin joint fixedly attached to the trailing edge flap.

10. The system of claim 1 wherein the pin joint linkage assembly is operatively configured to provide clearance for an up position of a trailing edge variable camber (TEVC) system.

11. An aircraft comprising:
    a fuselage;
    at least one wing coupled to the fuselage, the at least one wing having a leading edge, a trailing edge, and a fixed structure therebetween;
    a trailing edge flap coupled to the trailing edge and being movable relative to the at least one wing between a stowed position and a deployed position;
    a droop panel operation system coupled between the fixed structure and the trailing edge flap, the droop panel operation system comprising:
        a droop panel positioned on a wing upper surface and forward of the trailing edge flap;
        a pin joint linkage assembly operatively coupled between and to the fixed structure, the droop panel, and the trailing edge flap, the pin joint linkage assembly comprising:

a first link having a first end coupled to a first pin joint fixedly attached to the fixed structure, and having a second end coupled to a second pin joint;

a second link coupled to the first link, the second link having a first end pivotably connected to a third pin joint, a second end connected to a fourth pin joint, and an angled portion pivotably connected to the second pin joint and positioned between the first and second ends of the second link, wherein the second pin joint and the third pin joint are separate; and a third link coupled to the second link, the third link having a first end coupled to the fourth pin joint, and having a second end coupled to a fifth pin joint fixedly attached to the trailing edge flap; and a control system operatively coupled to the pin joint linkage assembly, the control system configured to control the pin joint linkage assembly to operate the droop panel by concurrently moving both the droop panel and the trailing edge flap from the stowed position to the deployed position in a single coordinated motion, thus allowing the droop panel to be driven off the trailing edge flap without use of a motor device.

12. The aircraft of claim 11 wherein the droop panel operation system further comprises an integration space located between the fixed structure and the pin joint linkage assembly, wherein the integration space is configured for installation of one or more air vehicle systems comprising an electrical system, a mechanical system, and a hydraulic system, and further wherein the integration space is preserved and cleared when the droop panel and the trailing edge flap are moved from the stowed position to the deployed position in the single coordinated motion by the pin joint linkage assembly.

13. The aircraft of claim 11 wherein the pin joint linkage assembly comprises:

the first link comprising a pair of first links wherein each individual of the pair of first links has a first end coupled to the first pin joint fixedly attached to the fixed structure, and further wherein each individual of the pair of first links has a second end coupled to the second pin joint positioned between the pair of first links;

the second link coupled to the pair of first links and positioned substantially between the pair of first links, the second link having the first end pivotably connected to the third pin joint, the second end connected to the fourth pin joint, and the angled portion pivotably connected to the second pin joint and positioned between the first and second ends of the second link, wherein the second pin joint and the third pin joint are separate; and the third link comprising a pair of third links coupled to the second link, wherein each individual of the pair of third links has a first end coupled to the fourth pin joint, so that the second end of the second link is positioned between the pair of third links, and further wherein each individual of the pair of third links has a second end coupled to the fifth pin joint fixedly attached to the trailing edge flap.

14. The aircraft of claim 11 wherein the pin joint linkage assembly is operatively configured to provide clearance for an up position of a trailing edge variable camber (TEVC).

15. A method for operating a droop panel on an air vehicle, the method comprising the steps of:

operatively coupling a pin joint linkage assembly between and to a fixed structure on a wing of the air vehicle, to a droop panel positioned aft of the fixed structure, and to a trailing edge flap positioned aft of the droop panel, the pin joint linkage assembly comprising:

a first link having a first end coupled to a first pin joint fixedly attached to the fixed structure, and having a second end coupled to a second pin joint;

a second link coupled to the first link, the second link having a first end pivotably connected to a third pin joint, a second end connected to a fourth pin joint, and an angled portion pivotably connected to the second pin joint and positioned between the first and second ends of the second link, wherein the second pin joint and the third pin joint are separate; and a third link coupled to the second link, the third link having a first end coupled to the fourth pin joint, and having a second end coupled to a fifth pin joint fixedly attached to the trailing edge flap; and using the pin joint linkage assembly to operate the droop panel by concurrently moving both the droop panel and the trailing edge flap from a stowed position to a deployed position in a single coordinated motion, thus allowing the droop panel to be driven off the trailing edge flap without use of a motor.

16. The method of claim 15 further comprising the step of coupling the pin joint linkage assembly to a control system configured to control the pin joint linkage assembly and to concurrently move the droop panel and the trailing edge flap to the deployed position, when the air vehicle is in a takeoff mode or a landing mode, and to concurrently move the droop panel and the trailing edge flap to the stowed position, when the air vehicle is in a cruise mode.

17. The method of claim 15 wherein the step of operatively coupling the pin joint linkage assembly comprises operatively coupling the pin joint linkage assembly between and to the fixed structure comprising a supporting wing beam, to the droop panel comprising an inboard droop panel positioned aft of the supporting wing beam, and to the trailing edge flap comprising an inboard trailing edge flap positioned aft of the inboard droop panel.

18. The method of claim 15 wherein the step of operatively coupling the pin joint linkage assembly comprises operatively coupling a pin joint linkage assembly comprising:

the first link comprising a pair of first links wherein each individual of the pair of first links has a first end coupled to the first pin joint fixedly attached to the fixed structure, and further wherein each individual of the pair of first links has a second end coupled to the second pin joint positioned between the pair of first links;

the second link coupled to the pair of first links and positioned substantially between the pair of first links, the second link having the first end pivotably connected to the third pin joint, the second end connected to the fourth pin joint, and the angled portion pivotably connected to the second pin joint and positioned between the first and second ends of the second link, wherein the second pin joint and the third pin joint are separate; and the third link comprising a pair of third links coupled to the second link, wherein each individual of the pair of third links has a first end coupled to the fourth pin joint, so that the second end of the second link is positioned between the pair of third links, and further wherein each individual of the pair of third links has a second end coupled to the fifth pin joint fixedly attached to the trailing edge flap.

19. The method of claim 15 wherein the step of using the pin joint linkage assembly to concurrently move the droop panel and the trailing edge flap comprises rotating the trailing edge flap about a flap hinge line to pull the third link in an aft direction and a downward direction, thus rotating and pulling the second link in the aft direction and drooping the droop panel in the downward direction, thus allowing for preservation and clearance of an integration space between the fixed structure and the pin joint linkage assembly, wherein the integration space is configured for installation of one or more air vehicle systems comprising an electrical system, a mechanical system, and a hydraulic system.

20. The method of claim 15 further comprising the step of using the pin joint linkage assembly to provide clearance for an up position of a trailing edge variable camber (TEVC).

* * * * *